United States Patent
Khosravirad et al.

(10) Patent No.: US 11,984,946 B2
(45) Date of Patent: May 14, 2024

(54) GRID OF BEAM-TYPE DESIGN AND IMPLEMENTATION OF A RECONFIGURABLE INTELLIGENT SURFACE

(71) Applicant: Nokia Solutions and Networks Oy, Espoo (FI)

(72) Inventors: Saeed Reza Khosravirad, Murray Hill, NJ (US); Divyakumar Mahiman Badheka, Murray Hill, NJ (US); Jakub Sapis, Murray Hill, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/471,691

(22) Filed: Sep. 21, 2023

(65) Prior Publication Data
US 2024/0120968 A1    Apr. 11, 2024

(30) Foreign Application Priority Data
Sep. 23, 2022  (FI) ...................... 20225832

(51) Int. Cl.
*H04B 7/04* (2017.01)
*H04B 7/0456* (2017.01)

(52) U.S. Cl.
CPC ....... *H04B 7/04013* (2023.05); *H04B 7/0456* (2013.01)

(58) Field of Classification Search
CPC .......................... H04B 7/04013; H04B 7/0456
See application file for complete search history.

(56) References Cited

U.S. PATENT DOCUMENTS

| | | | |
|---|---|---|---|
| 11,218,199 B2 * | 1/2022 | Chen | ............ H04B 7/0456 |
| 2017/0338555 A1 * | 11/2017 | Lee | ............ H01Q 21/22 |

(Continued)

FOREIGN PATENT DOCUMENTS

| | | |
|---|---|---|
| CN | 112039567 A | 12/2020 |
| CN | 112994765 A | 6/2021 |

(Continued)

OTHER PUBLICATIONS

Renzo et al., "Smart radio environments empowered by reconfigurable AI meta-surfaces: an idea whose time has come", EURASIP Journal on Wireless Communications and Networking, vol. 129, May 23, 2019, pp. 1-20.

(Continued)

*Primary Examiner* — Vineeta S Panwalkar
(74) *Attorney, Agent, or Firm* — Nokia Solutions and Networks Oy

(57) ABSTRACT

According to an aspect, there is provided an apparatus for performing the following. The apparatus maintains, in at least one memory, information on a reference incidence direction and reference configuration information defining a plurality of configurations of a plurality of tunable load impedance circuits of a tunable reflective array of a reconfigurable intelligent surface or a subpanel thereof for the reference incidence direction. The apparatus measures an incidence direction from which electromagnetic waves are received by the reconfigurable intelligent surface. The apparatus calculates, based on the reference incidence direction, the measured incidence direction and the reference configuration information, corrected configuration information defining a plurality of corrected configurations for the measured incidence direction. Finally, the apparatus configures the plurality of tunable load impedance circuits according to a corrected configuration.

17 Claims, 10 Drawing Sheets

(56) References Cited

U.S. PATENT DOCUMENTS

| | | |
|---|---|---|
| 2021/0036762 A1 | 2/2021 | Abedini et al. |
| 2021/0068050 A1 | 3/2021 | Sampath et al. |
| 2022/0059943 A1 | 2/2022 | Saab et al. |
| 2022/0231753 A1 | 7/2022 | Bengtsson et al. |

FOREIGN PATENT DOCUMENTS

| | | |
|---|---|---|
| WO | 2021/239259 A1 | 12/2021 |
| WO | 2022/058296 A1 | 3/2022 |
| WO | 2022/063435 A1 | 3/2022 |
| WO | 2022/129262 A2 | 6/2022 |

OTHER PUBLICATIONS

Hu et al., "Beyond massive MIMO: The potential of data transmission with large intelligent surfaces", IEEE Transactions on Signal Processing, vol. 66, No. 10, May 15, 2018, pp. 2746-2758.

Zhang et al., "6G Wireless Networks: Vision, Requirements, Architecture, and Key Technologies", IEEE Vehicular Technology Magazine, vol. 14, No. 3, Sep. 2019, pp. 28-41.

Tang et al., "Wireless communications with programmable metasurface: New paradigms, opportunities, and challenges on transceiver design", IEEE Wireless Communications, vol. 27, No. 2, Apr. 2020, pp. 180-187.

Ozdogan et al., "Intelligent reflecting surfaces: Physics, propagation, and pathloss modeling", IEEE Wireless Communications Letters, vol. 9, No. 5, May 5, 2020, pp. 581-585.

Badheka et al., "IRS Aided Communication Model for Compact MIMO Systems", IEEE International Conference on Communications (ICC), Jun. 14-23, 2021, 7 pages.

Wu et al., "Intelligent reflecting surface enhanced wireless network via joint active and passive beamforming", IEEE Transactions on Wireless Communications, vol. 18, No. 11, Nov. 2019, pp. 5394-5409.

Wu et al., "Towards smart and reconfigurable environment: Intelligent reflecting surface aided wireless network", IEEE Communications Magazine, vol. 58, No. 1, Jan. 2020, pp. 106-112.

Renzo et al., "Smart Radio Environments Empowered by Reconfigurable Intelligent Surfaces: How it Works, State of Research, and Road Ahead", IEEE Journal on Selected Areas in Communications, vol. 38, No. 11, Nov. 2020, pp. 2450-2525.

Torkzaban et al., "Shaping mmWave Wireless Channel via Multi-Beam Design using Reconfigurable Intelligent Surfaces", arXiv, Oct. 11, 2021, 6 pages.

Balanis, "Antenna Theory: Analysis and Design", Wiley, 4th Edition, Feb. 2016, 1104 Pages.

Arun et al., "RFocus: Beamforming using thousands of passive antennas", Proceedings of the 17th USENIX Symposium on Networked Systems Design and Implementation (NSDI '20), Feb. 25-27, 2020, pp. 1047-1061.

"5G/NR—Beam Management", ShareTechnote, Retrieved on Sep. 20, 2023, Webpage available at : https://www.sharetechnote.com/html/5G/5G_Phy_BeamManagement.html.

"5G Testing: 3GPP Beam Management", Keysight, Retrieved on Sep. 20, 2023, Webpage available at : https://blogs.keysight.com/blogs/inds.entry.html/2020/02/28/5g_testing_3gpp_bea-wkdn.html.

"ZTE builds efficient way to 5G-Advanced and 6G with RIS solution", rcrwireless, Retrieved on Sep. 18, 2023, Webpage available at : https://www.rcrwireless.com/20220302/5g/zte-builds-efficient-way-to-5g-advanced-and-6g-with-ris-solution.

Jamali et al., "Power Efficiency, Overhead, and Complexity Tradeoff of IRS Codebook Design—Quadratic Phase-Shift Profile", IEEE Communications Letters, vol. 25, No. 6, Jun. 2021, pp. 2048-2052.

Costa et al., "Electromagnetic Model of Reflective Intelligent Surfaces", IEEE Open Journal of the Communications Society, vol. 2, Jun. 24, 2021, pp. 1577-1589.

Ying et al., "GMD-Based Hybrid Beamforming for Large Reconfigurable Intelligent Surface Assisted Millimeter-Wave Massive MIMO", IEEE Access, vol. 8, Jan. 21, 2020, pp. 19530-19539.

Li et al., "Passive Beamforming Design for IRS Communication System with Few-Bit ADCs", 4th International Conference on Information Communication and Signal Processing (ICICSP), Sep. 24-26, 2021, pp. 501-505.

Mei et al., "Multi-Beam Multi-Hop Routing for Intelligent Reflecting Surfaces Aided Massive MIMO", arXiv, Aug. 24, 2021, pp. 1-16.

Alamzadeh et al., "A reconfigurable intelligent surface with integrated sensing capability", Scientific Reports, Oct. 2021,pp. 1-10.

Chen et al., "Angle-Dependent Phase Shifter Model for Reconfigurable Intelligent Surfaces: Does the Angle-Reciprocity Hold?", arXiv, May 9, 2020, pp. 1-9.

Zhang et al., "Learning Reflection Beamforming Codebooks for Arbitrary RIS and Non-Stationary Channels", arXiv, Oct. 5, 2021, pp. 1-5.

Office Action received for corresponding Finnish Patent Application No. 20225832, dated Jan. 23, 2023, 11 pages.

Office Action received for corresponding Finnish Patent Application No. 20225832, dated Jun. 22, 2023, 6 pages.

Liu et al., "Simulation and Field Trial Results of Reconfigurable Intelligent Surfaces in 5G Networks", IEEE Access, vol. 10, Nov. 18, 2022, pp. 122786-122795.

"RAN Rel-19 Overview", CICT Mobile, CATT, May 2023, 28 pages.

"Deutsche Telekom's perspective on RAN Rel-19", 3GPP RAN WS on Rel-19, RWS-23xxxx, Deutsche Telekom AG, Jun. 15 & 16, 2023, 20 pages.

"Initial views on Rel-19", NTT Docomo, Inc., 2023, pp. 1-43.

"Views on NR Rel-19", China Telecom, May 4, 2023, pp. 1-18.

"Rel-19 Qualcomm Proposals", Qualcomm Technologies, Q1 2023, pp. 1-41.

"Discussion on Rel-19", KDDI corporation, 2023, 11 pages.

"Apple Views on RAN Rel-19", Apple, May 16, 2023, pp. 1-87.

"3rd Generation Partnership Project; Technical Specification Group Radio Access Network; Evolved Universal Terrestrial Radio Access (E-UTRA); Relay architectures for E UTRA (LTE-Advanced) (Release 9)", 3GPP TR 36.806, V9.0.0, Mar. 2010, pp. 1-34.

"3rd Generation Partnership Project; Technical Specification Group Radio Access Network; NR; Study on Integrated Access and Backhaul; (Release 16)", 3GPP TR 38.874, V16.0.0, Dec. 2018, pp. 1-111.

"3rd Generation Partnership Project; Technical Specification Group Radio Access Network; NR; Integrated access and backhaul radio transmission and reception (Release 18)", 3GPP TS 38.174, V18.1.0, Jun. 2023, pp. 1-319.

"3rd Generation Partnership Project; Technical Specification Group Radio Access network; Study on NR network-controlled repeaters; (Release 18)", 3GPP TS 38.867, V18.0.0, Sep. 2022, pp. 1-21.

Guo et al., "A Comparison between Network-Controlled Repeaters and Reconfigurable Intelligent Surfaces", arXiv, Nov. 13, 2022, 7 pages.

Ayoubi et al., "Network-Controlled Repeaters vs. Reconfigurable Intelligent Surfaces for 6G mmW Coverage Extension", arXiv, Nov. 15, 2022, 7 pages.

Extended European Search Report received for corresponding European Patent Application No. 23198753.8, dated Feb. 23, 2024, 9 pages.

\* cited by examiner

731: Maintain, in at least one memory, information on plurality of reference incidence directions and plurality of reference incidence direction -specific sets of reference configuration information for tunable load impedance circuits of tunable reflective array of RIS 732: Receive reference incidence direction selection information via control channel 733: Configure plurality of tunable load impedance circuits according to reference incidence direction selection information

Fig. 7D

801: Maintain, in at least one memory, information on reference incidence direction(s) and reference configuration information for tunable load impedance circuits of tunable reflective array of RIS or subpanel thereof for reference incidence direction(s)

802: Maintain, in at least one memory, reflection beam and/or reference incidence direction scheduling configuration information 803: Configure plurality of tunable load impedance circuits according to different configurations periodically or regularly according to reflection beam and/or reference incidence direction scheduling configuration information

Fig. 8

GRID OF BEAM-TYPE DESIGN AND IMPLEMENTATION OF A RECONFIGURABLE INTELLIGENT SURFACE

TECHNICAL FIELD

Various example embodiments relate to wireless communications.

BACKGROUND

Reconfigurable intelligent surfaces (RISs) are artificial engineered reflective surfaces comprising an array of reflective elements (with typically in the order of 10 000 elements) whose reflection properties (namely, at least reflected phase) is tunable so that multiple different reflection beams may be implemented. RISs have been widely studied in the literature as means for low-cost coverage extension, and for providing additional degrees of freedom in controlling the propagation environment. RISs provide a cheaper and less complex solution compared to repeater/relays, while also simplifying the installation and deployment due to flexibility in design. RISs are also expected to be easier in terms of installation permits and zoning issues, compared to integrated access and backhaul (IAB) relays and densification-type solutions. RISs have also been shown to provide significant signal-to-noise ratio (SNR) improvements for non-line-of-sight (NLOS) scenarios. Consequently, use of RISs may be especially beneficial in the millimeter wave (mmWave) frequency bands which suffer from high path-loss and poor scattering and which thus conventionally have to rely on line-of-sight (LOS) links, instead of NLOS links. This serves to limit the signal coverage in these frequency bands. While multiple solutions for configuring the reconfigurable intelligent surfaces have been presented, there remains a need for a solution which would be both computationally non-demanding and simple in terms of implementation and deployment.

BRIEF DESCRIPTION

According to an aspect, there is provided the subject matter of the independent claims. Embodiments are defined in the dependent claims. The scope of protection sought for various embodiments is set out by the independent claims.

The embodiments and features, if any, described in this specification that do not fall under the scope of the independent claims are to be interpreted as examples useful for understanding various embodiments.

BRIEF DESCRIPTION OF DRAWINGS

In the following, example embodiments will be described in greater detail with reference to the attached drawings, in which

FIGS. 4 to 6, 7A, 7B, 7C, 7D and 8 illustrate exemplary processes according to embodiments.

DETAILED DESCRIPTION OF SOME EMBODIMENTS

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. The embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

As used in this application, the term 'circuitry' may refer to one or more or all of the following: (a) hardware-only circuit implementations, such as implementations in only analog and/or digital circuitry, and (b) combinations of hardware circuits and software (and/or firmware), such as (as applicable): (i) a combination of analog and/or digital hardware circuit(s) with software/firmware and (ii) any portions of hardware processor(s) with software, including digital signal processor(s), software, and memory(ies) that work together to cause an apparatus, such as a terminal device or an access node, to perform various functions, and (c) hardware circuit(s) and processor(s), such as a microprocessor(s) or a portion of a microprocessor(s), that requires software (e.g. firmware) for operation, but the software may not be present when it is not needed for operation. This definition of 'circuitry' applies to all uses of this term in this application, including any claims. As a further example, as used in this application, the term 'circuitry' also covers an implementation of merely a hardware circuit or processor (or multiple processors) or a portion of a hardware circuit or processor and its (or their) accompanying software and/or firmware.

Figure 1:
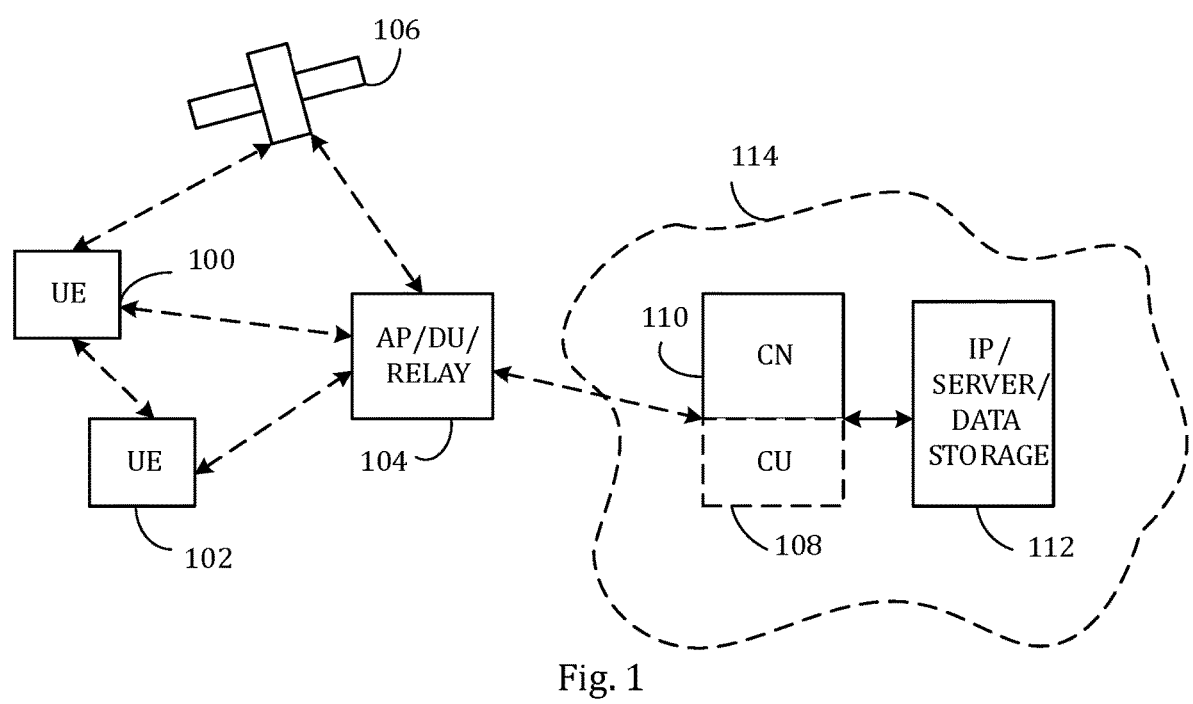
FIG. 1 illustrates an exemplified wireless communication system.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows devices 100 and 102. The devices 100 and 102 may, for example, be user devices. The devices 100 and 102 are configured to be in a wireless connection on one or more communication channels with a node 104. The node 104 is further connected to a core network 110. In one example, the node 104 may be an access node such as (e/g)NodeB providing or serving devices in a cell. In one example, the node 104 may be a non-3GPP access node. The physical link from a device to a (e/g)NodeB is called uplink or reverse link and the physical link from the (e/g)NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 110 (CN or next generation core NGC). Depending on the system, the counterpart on the CN side can be a serving gateway (S-GW, routing and forwarding user data packets), packet data network gateway (P-GW), for providing connectivity of devices (UEs) to external packet data networks, or mobile management entity (MME), etc.

The device (also called user device, UE, user equipment, user terminal, terminal device, etc.) illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station.

The device typically refers to a device (e.g. a portable or non-portable computing device) that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring humanto-human or human-to-computer interaction, e.g., to be used in smart power grids and connected vehicles. The device may also utilise cloud. In some applications, a device may comprise a user portable device with radio parts (such as a watch, earphones or eyeglasses) and the computation is carried out in the cloud. The device (or in some embodiments a layer 3 relay node) is configured to perform one or more of user equipment functionalities. The device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input—multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz— cmWave, below 6 GHz— cmWave— mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic selfhealing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

The technology of Edge cloud may be brought into a radio access network (RAN) by utilizing network function virtualization (NVF) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well. 5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano) satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the device may have an access to a plurality of radio cells and the system may comprise also other apparatuses, such as physical layer relay nodes or other network elements, etc. At least one of the (e/g)NodeBs may be a Home(e/g) nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g) Node Bs, includes, in addition to Home (e/g)NodeBs (H(e/g) nodeBs), a home node B gateway, or HNB-GW (not shown in FIG. 1). A HNB Gateway (HNB-GW), which is typically installed within an operator's network may aggregate traffic from a large number of HNBs back to a core network.

6G networks are expected to adopt flexible decentralized and/or distributed computing systems and architecture and ubiquitous computing, with local spectrum licensing, spectrum sharing, infrastructure sharing, and intelligent automated management underpinned by mobile edge computing, artificial intelligence, short-packet communication and blockchain technologies. Key features of 6G will include intelligent connected management and control functions, programmability, integrated sensing and communication, reduction of energy footprint, trustworthy infrastructure, scalability and affordability. In addition to these, 6G is also targeting new use cases covering the integration of localization and sensing capabilities into system definition to unifying user experience across physical and digital worlds.

As described above, a reconfigurable intelligent surface (RIS) is an artificial engineered reflective surface comprising an array of reflective elements whose reflection properties (namely, at least reflected phase, optionally also gain) is tunable so that multiple different reflection beams may be implemented. In order to achieve significant gain using an RIS, the number of reflective elements may be the order of several tens of thousands. The phase shift induced by each reflective element may be tunable by a processing unit of the RIS.

RISs have been widely studied in the literature as means for low-cost coverage extension, and for providing additional degrees of freedom in controlling the propagation environment. RISs provide a cheaper and less complex solution compared to repeater/relays, while also simplifying the installation and deployment due to flexibility in design. RISs are also expected to be easier in terms of installation permits and zoning issues, compared to IAB relays and densification-type solutions. RISs have also been shown to provide significant signal-to-noise ratio (SNR) improvements for non-line-of-sight (NLOS) scenarios. Consequently, use of RISs may be especially beneficial in the millimeter wave (mmWave) frequency bands which suffer from high path-loss and poor scattering and which thus conventionally (i.e., when RISs are not used) have to rely mostly on line-of-sight (LOS) links, instead of NLOS links. Having to rely mostly or exclusively on LOS links may result in the receiver being often times in a blind spot due to signal blockage, especially in an urban environment, thereby limiting the signal coverage. More moderate benefits may be achieved at lower frequencies (i.e., at frequencies below 10 GHz).

Substantial gain has been demonstrated by using an RIS with a sufficiently large number of reconfigurable reflective elements for steering a desirable reflection of the signal towards a NLOS user. For example, a practical RIS may employ a 95×95 reflective array for a 1 $m^2$ panel at 28 GHz, where the reflective elements are half-wavelength patch elements having Nyquist spacing. This high number of individual reflective elements necessitates solving a highly complex optimization problem to adjust the load on the elements properly according to the location/channel state information (CSI) of the target terminal device.

Thus, the question of how to dynamically and efficiently configure a reconfigurable intelligent surface in an optimal manner for a given situation remains. A common approach for RIS optimization is to tune the M load elements of the RIS panel to maximize the reflection from RIS for a user based on the instantaneous cascade channel of between a transmitter (Tx), the RIS and the receiver (Rx). Therefore, the expectation is to acquire precise and frequent CSI, which is an expensive overhead but also adds to the complexity of the RIS optimization problem, for which finding a closed-form solution has proven to be difficult. To overcome these problems, it has, for example, been proposed to use artificial intelligence (e.g., deep reinforcement learning) to solve the RIS optimization problem in real-time. However, due to the computationally demanding nature of such a solution, using artificial intelligence for RIS optimization requires either providing a high rate control channel between the RIS and the edge artificial intelligence analytics or implementing a complex and costly processing unit at the RIS. Both those solutions have raised serious concerns about the viability of the RIS deployment.

Since the operation of the RIS is based on reflecting an incident electromagnetic signal received from a radio transmitter or transceiver (e.g., from an access node), the incidence direction plays a critical role in the design, implementation and deployment of the RIS. The change in the incidence direction causes a change in the beam shape and/or direction if no changes are made to the configuration of the RIS. The incidence direction may change, for example, as a result of:

- need for switching between different transmitters, e.g., in case of multi-transmission/reception point (multi-TRP) access node,
- use of mobile radio transmitters, e.g., in device-to-device (D2D) and vehicle-tovehicle (V2V) communications and
- slight variation in the orientation of a large size RIS caused by the environment, e.g., by wind, rain and other weather phenomena.

When the incidence angle changes suddenly, the RIS should be reconfigured without delay to take into account this change in order to maintain the same beam shape and direction. Considering the typically large number of individual reflecting element in the RIS, the question of how to perform this reconfiguration is far from a trivial problem.

The embodiments to be discussed below seek to provide a solution overcoming or at least alleviating at least some of the problems related to RIS optimization described above. Namely, the embodiments provide a Grid of Beams (GoB)-based solution for RIS optimization, where a set of reflection beams (equally called transmission beams) are pre-configured to the RIS and are deployed in a similar manner to GoB-based access in (mmWave) phased arrays. This, not only substantially reduces the manufacturing costs of the RIS, but also makes the installation and deployment of the RIS simpler with less overhead. The proposed solution enables seamless integration of the RIS into existing cellular networks such as the one discussed in connection with FIG. 1.

Figure 2A:
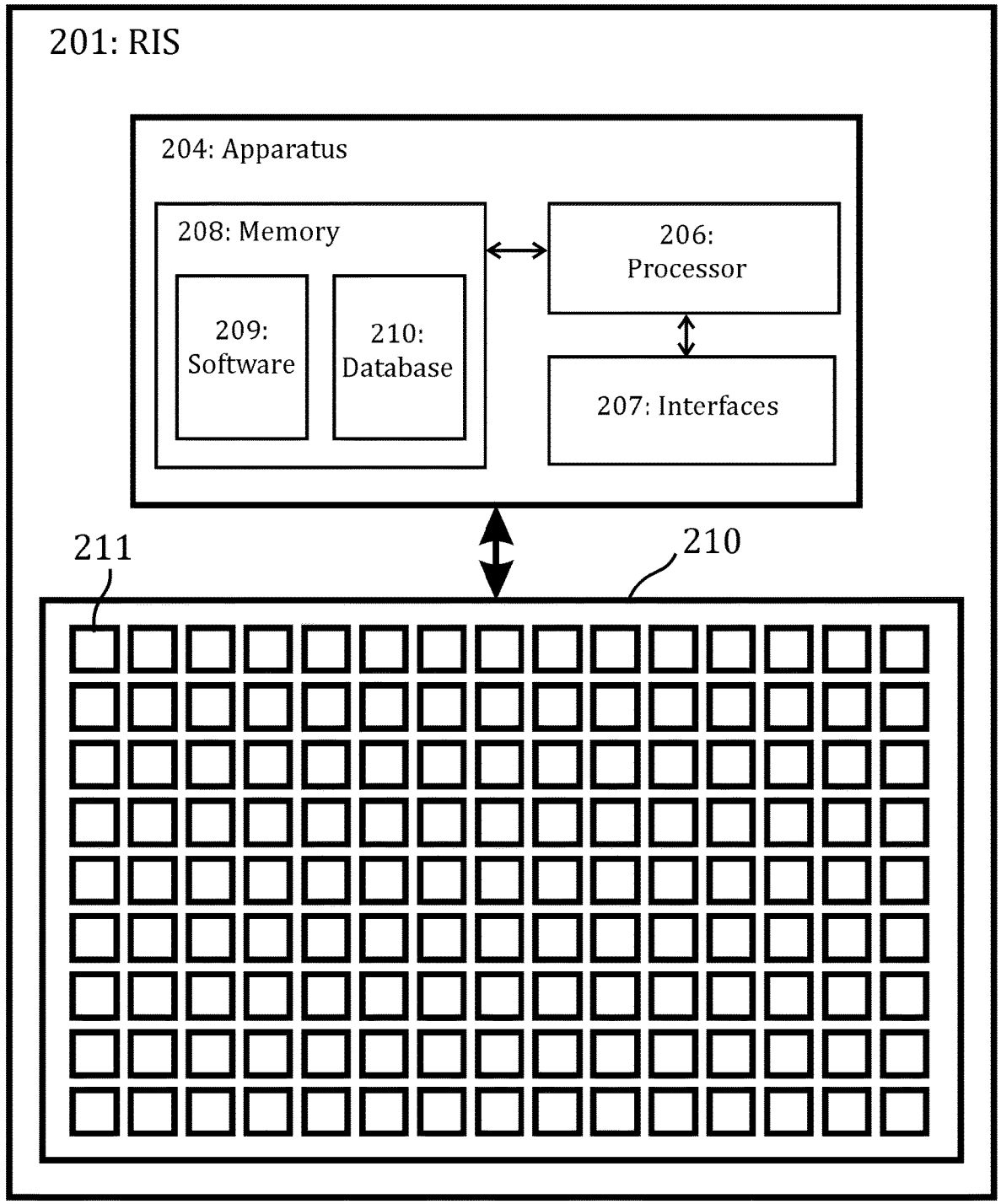
FIGS. 2A and 2B illustrate a reconfigurable intelligent surface according to an embodiment and a tunable reflective array of said reconfigurable intelligent surface, respectively.
Figure 2B:
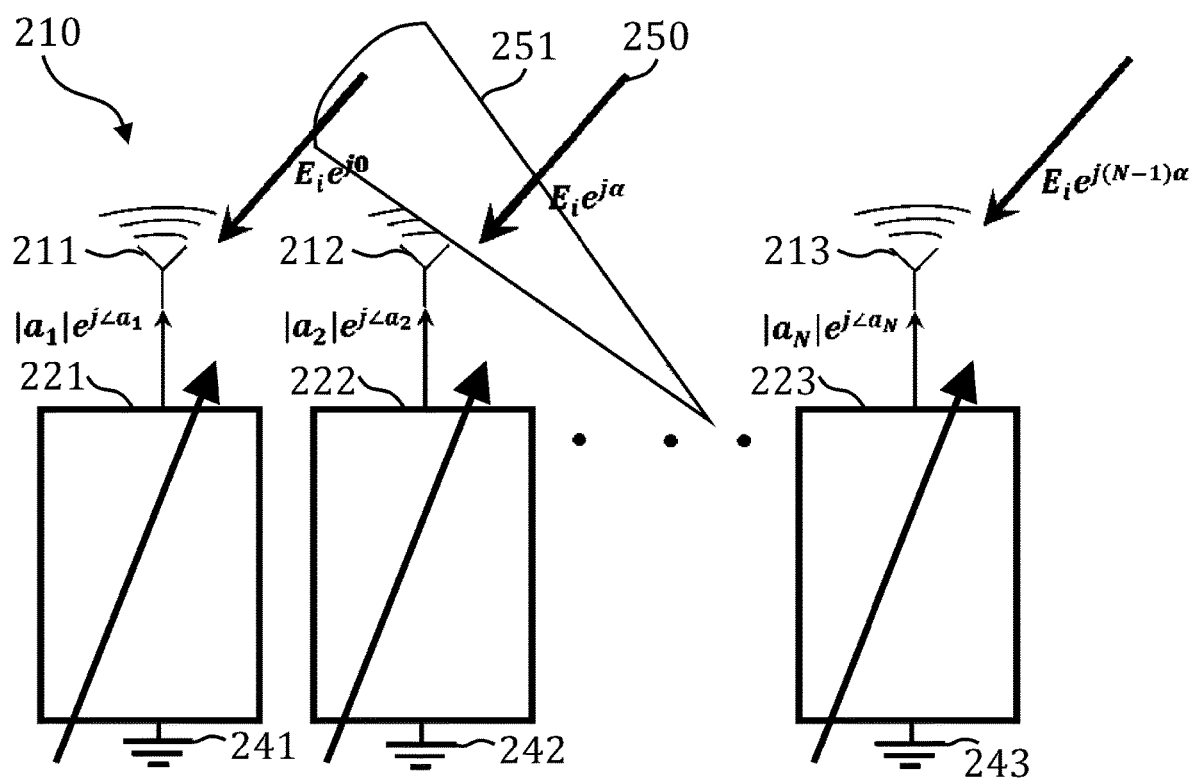

FIG. 2A shows a schematic view of a (reflecting) reconfigurable intelligent surface (RIS) 201 (equally called an intelligent reflective surface, IRS) according to an embodiment while FIG. 2B shows a more detailed view of a tunable reflective array 210 of said RIS 201. In the following, FIGS. 2A and 2B are discussed in parallel. The RIS 201 may be deployable between one of the terminal devices 100, 102 and the access node 104 of FIG. 1.

Referring to FIGS. 2A and 2B, the RIS 201 comprises a tunable reflective array 210 (equally called an electrically tunable reflective array or a reflectarray) comprising a plurality of reflective (or equally reflecting) elements 211, 212, 213 and a plurality of tunable load impedance circuits 221 to 223 electrically connected (directly) to the plurality of reflective elements 211 to 213 for affecting phases of electromagnetic waves reflected by the plurality of reflective elements 211 to 213. In other words, phase of the reflected electromagnetic wave generated by a given reflective element 211 to 213 is tunable via a respective tunable load impedance circuit 221 to 223. Due to the constructive and destructive interference between the electromagnetic waves generated by the plurality of reflective elements 211, 212, 213, different reflection (or equally transmission) beams may be produced by adjusting the configuration of the plurality of tunable load impedance circuits 221 to 223. The shape and/or direction of the reflection beam 251 may be adjusted in this way.

The RIS 201 (or specifically the tunable reflective array 210) may be configured to operate at radio frequencies or, in practice, certain subrange thereof. Radio frequencies may be defined, here and in the following, according the common definition, as a frequency range of 3 kHz to 300 GHz.

A particular configuration of the plurality of tunable load impedance circuits 221 to 223 for producing a particular reflection beam may be specific to a particular incidence direction (or equally incidence beam direction). In other words, if the incidence direction from which the electromagnetic waves hit the RIS 201 changes, the direction of the reflection beam 251 may also change (unless the configuration of the plurality of tunable load impedance circuits 221 to 223 is adjusted to account for the change). The reason for this behavior is that the phase of the incident electric field at the location of a given reflective elements 211 to 213 is dependent not only on the location of the given reflective element 211 to 213 but also on the incidence direction. The phase of the electric field at the locations of the plurality of reflective elements is defined in FIG. 2B as na, where a is a certain phase shift value dependent on, e.g., element spacing, frequency and incidence angle and n has integer values from 0 to N−1 depending on the particular reflective element (N being the number of reflective elements along one direction). The incident direction has, in particular, an effect on the relative phases between the plurality of reflective elements 211 to 213. Thus, knowing the incidence direction is vitally important for the correct operation of the RIS 201.

The plurality of reflective elements 211 to 213 may have identical geometry and dimensions. The plurality of reflective elements 211 to 213 may be at least partially made of a metal or an alloy (or other electrically conductive material). The plurality of reflective elements 211 to 213 may be resonant elements. In particular, the plurality of reflective elements 211 to 213 may be resonant elements configured to operate (i.e., resonate) at one or more operational frequencies of the RIS 201. In other embodiments, the plurality of reflective elements 211 to 213 may be electrically small antennas, i.e., antennas whose dimensions are at least smaller (preferably much smaller) than half a wavelength or a quarter of a wavelength.

As depicted in FIG. 2A, the plurality of reflective elements 211 to 213 may be, for example, patch (antenna) elements, where the patch may, for example, have a shape of a square, a rectangle, a circle, an ellipsoid, a (regular) polygon, a (circular) ring, a ring sector or a disc sector. In some embodiments, the plurality of reflective elements 211 to 213 may be printed circuit board (PCB)-based antenna elements other than patch antenna elements.

The tunable reflective array 210 comprising the plurality of reflective elements 211 to 213 may be a uniform array meaning that the plurality of reflective elements 211 to 213 may be equally spaced. As also depicted in FIG. 2A, the tunable reflective array 210 may be a two-dimensional array or more specifically a two-dimensional uniform array. In other embodiments, the tunable reflective array 210 may be a one-dimensional array or more specifically a one-dimensional uniform array, that is, the plurality of reflective elements 211 to 213 may be arranged along a line.

In some embodiments, the number of the plurality of reflective elements 211 to 213 in the tunable reflective array 210 may be larger than or equal to 100. In other embodiments, the number of the plurality of reflective elements 211 to 213 in the tunable reflective array 210 may be larger than or equal to 1000 or larger than or equal to 5000 or larger than or equal to 10000.

In some embodiments, adjacent reflective elements in the plurality of reflective elements 211 to 213 may be arranged to be within in each other's near field ranges at the one or more operational frequencies of the RIS 201. The near field range may be defined to be from zero to one wavelength at a given operational frequency.

The plurality of tunable load impedance circuits 221 to 223 may be usable for tuning load impedances of the plurality of reflective elements 211 to 213 (i.e., load impedances seen or experienced by the plurality of reflective elements 211 to 213). As is well-known from antenna theory, the change in the load impedance of a radiating element causes a change in the phase of the radiated electromagnetic wave. Each reflection beam implementable by the RIS 201 may be identified by a load impedance matrix comprising information on load impedances of the plurality of tunable load impedance circuits 221 to 223. In other words, the load impedance matrix may comprise (or consist of) a value of load impedance value for each of the plurality of tunable load impedance circuits 221 to 223. The plurality of tunable load impedance circuits 221 to 223 may be identical circuits (though obviously the tuning may differ between elements).

Some examples of the plurality of tunable load impedance circuits 221 to 223 may comprise:
- a tunable (grounded) capacitor or other tunable (grounded) capacitive or reactive circuit,
- a tunable digital or analog filter and
- a combination of a non-tunable (grounded) parasitic load impedance circuit and an on/off switch electrically connected to the non-tunable (grounded) parasitic load impedance circuit.

In some embodiments, the plurality of tunable load impedance circuits 221 to 223 may comprise at least a respective plurality of tunable phase shifting elements for enabling the tuning of the plurality of tunable load impedance circuits 221 to 223. Thus, the plurality of tunable load impedance circuits 221 to 223 may serve to tune load impedances of the plurality of reflective elements 211 to 213 (i.e., load impedances seen or experienced by the plurality of reflective elements 211 to 213) at least by adjusting phase shifts induced by the plurality of tunable phase shifting elements.

The plurality of tunable phase shifting elements comprised in the plurality of tunable load impedance circuits 221 to 223 may be identical elements (though obviously the tuning may differ between them at any given time). The plurality of tunable phase shifting elements may be (dedicated) tunable phase shifters or any other elements capable of inducing a phase shift which may be tuned electrically. Specifically, the plurality of tunable phase shifting elements may be tunable n-bit phase shifters, where n may be any positive integer (i.e., 1, 2, 3 etc.).

In an embodiment, the plurality of tunable phase shifting elements comprised in the plurality of tunable load impedance circuits 221 to 223 may be one-bit phase shifters acting effectively as on/off switches for connecting the plurality of reflective elements 211 to 213 to a parasitic (impedance load) circuit or a plurality of respective parasitic (impedance load) circuits. Such simplistic RIS design may provide altogether $2^M$ different reflection patterns, where M is the number of the plurality of tunable phase shifting elements or equally the number of the plurality of reflective elements 211, 212, 213.

In some embodiments, all or at least some of the plurality of tunable impedance load circuits 221 to 223 may be active circuits for enabling tuning of gain applied to a reflected electromagnetic wave (i.e., tuning of the amplitude of the reflected electromagnetic wave), in addition to enabling tuning of the phase of the reflected electromagnetic wave. In such embodiments, each of said all or at least some of the plurality of tunable impedance load circuits 221 to 223 may comprise at least one tunable active circuit element such as a programmable gain amplifier or a tunable reflective amplifier.

To enable configuration of the plurality of tunable impedance load circuits 221 to 223 (i.e., to enable tuning of the phases and optionally amplitudes of the electromagnetic waves reflected by the plurality of reflective elements 211 to 213), the RIS 201 comprises an apparatus 204 (or, in general, one or more apparatuses). The apparatus 201 may be equally called a computing device, a processing device or a processing unit. The apparatus 204 may be specifically configured at least to adjust configuration (i.e., tuning) of the plurality of tunable impedance load circuits 221 to 223 of the tunable reflective array 210 according to embodiments (to be discussed below in detail). The apparatus device 204 is electrically connected (via its interfaces 207) at least to the tunable reflective array 210 (or specifically to at least to the plurality of tunable impedance load circuits 221 to 223 for enabling the tuning).

The apparatus 204 comprises a processor 206, interfaces 207 and a memory 208. The memory 208 comprises at least one database 210 and software 209 (i.e., one or more algorithms). The processor 206 may be a central processing unit (CPU) of the RIS 201. In some embodiments, one or more control circuitry such as one or more processors may be provided in the apparatus 204, instead of a single processor 206.

According to some embodiments, the apparatus 204 may comprise one or more control circuitry, such as at least one processor 206, and at least one memory 208, including one or more algorithms, such as a computer program code (software) 209, wherein the at least one memory 208 and the computer program code (software) 209 are configured, with the at least one processor 206, to cause the apparatus 201 to carry out any one of the exemplified functionalities of the apparatus 204 to be described below (in connection with FIGS. 4 to 6, 7A, 7B and 8). It is also feasible to use specific integrated circuits, such as ASIC (Application Specific Integrated Circuit), a field-programmable gate array (FPGA) or other components and devices for implementing the functionalities in accordance with different embodiments.

The memory 208 of the apparatus 204 may be implemented using any suitable data storage technology, such as semiconductor based memory devices, flash memory, magnetic memory devices and systems, optical memory devices and systems, fixed memory and removable memory.

The interfaces 207 of the apparatus 204 may comprise, for example, one or more communication interfaces comprising hardware and/or software for realizing communication connectivity according to one or more communication protocols. Specifically, the one or more interfaces 207 may comprise at least one interface providing a connection to the tunable reflective array 210 to enable the tuning. The one or more communication interfaces 207 may comprise standard well-known components such as an amplifier, filter, frequency-converter, (de) modulator, and encoder/decoder circuitries, controlled by the corresponding controlling units, and one or more antennas. The one or more communication interfaces 207 may also comprise a user interface.

In some embodiments, the interfaces 207 may comprise a radio receiver or transceiver or provide a connection to an external radio receiver or transceiver. In either case, the radio receiver or transceiver may be at least configured to receive one or more control signals from one or more access node over a control channel. The radio receiver or transceiver may comprise at least one (dedicated) antenna for reception (and possibly transmission). A plurality of different types of control signals may be defined, as will be described in detail in connection with FIGS. 7A, 7B, 7C and 7D. Alternatively, the radio receiver or transceiver may be configured to employ the tunable reflective array 210 for reception (and possibly transmission). In this latter case, the radio receiver or transceiver may be assumed to be electrically connected to the tunable reflective array 210. This electrical connection may be provided, in some embodiments, via a switch for switching between reception (and transmission) operation and reflection operation.

In some embodiments, there is provided a system comprising the reconfigurable intelligent surface 201 which comprises a radio receiver or transceiver for receiving one or more control signals via a control channel (as described above) and an access node (e.g., an access node 104 of FIG. 1) configured to transmit one or more control signals to the reconfigurable intelligent surface via the control channel. The one or more control signals may comprise at least one control signal of at least one control signal type discussed below in connection with FIGS. 7A, 7B, 7C and 7D. Specifically, the access node may comprise at least one processor, and at least one memory for storing instructions to be executed by the processor, wherein the at least one memory and the instructions are configured to, with the at least one processor, cause the access node at least to transmit the one or more control signals to the reconfigurable intelligent surface via the control channel. In some cases, the access node may also be able to receive signals over the control channel from the reconfigurable intelligent surface 201 (see, e.g., block 702 of FIG. 7A to be discussed below).

In some embodiments, the apparatus 204 may further comprise one or more user input devices (e.g., a control panel or a touch screen) for enabling the user to control the operation of the apparatus 204 (via the apparatus 204) and/or a display (not shown in FIG. 1). The one or more user input devices may be specifically electrically connected to the apparatus 204).

For reference, a mathematical formulation of the operation of the RIS or specifically the tunable reflective array of the RIS such as the tunable reflective array 210 of FIGS. 2A and 2B is provided in the following.

First, it is investigated how the beam shaping using an IRS may be carried out. It is assumed initially that the IRS has knowledge of a location of radio transmitter (or transceiver), i.e., the reference incidence direction defined by elevation and azimuth angles $(\theta_t, \phi_t)$ is known. The tunable reflective array is assumed to be a rectangular array with size R×C, where R and C are positive integers indicating the number of elements arranged along y- and z-directions, respectively. The objective is to achieve a uniform angular coverage in a pre-defined sector, using beamforming (or excitation) coefficients $\alpha_{rc}$, where subindices r and c are array parameters indicating together the specific reflective elements of the tunable reflective array to which the beamforming coefficients is to be applied (r having integer values from 1 to R and c having integer values from 1 to C). Thus, the desired beam pattern may be expressed as, $$E_{s\theta}(\theta,\phi)=c' \text{ for } \theta_l \leq \theta \leq \theta_u; \phi_l \leq \phi \leq \phi_u; \tag{1}$$

$$E_{s\theta}(\theta,\phi)==0 \text{ for other values of } \theta \text{ and } \phi, \tag{2}$$

where $E_{s\theta}(\theta, \phi)$ is the scattered or reflected electric field, $\theta$ and $\phi$ are elevation and azimuth angles to which electromagnetic waves are radiated (i.e., scattered or reflected), $\theta_l$ and $\theta_u$ are, respectively, lower and upper limits of the elevation angle, $\phi_l$ and $\phi_u$ are, respectively, lower and upper limits of the azimuth angle and c' is a constant. It should be emphasized that this is merely an example of the desired beam shape, that is, for different definition of $E_{s\theta}(\theta, \phi)$, similar methodology as will be described below may be used.

We consider a normalized scattered field as defined in (1) & (2) so as to eliminate dependence on radial distance $\rho$, i.e., $E_{s\theta}(\theta, \phi) \doteq \text{Re}^{jkR} E_{s\theta}(\rho, \theta, \phi)$. For small patches (l, h≪λ/4 with l and h being a length and height of the patch) and large number of elements, the RIS beam pattern is mainly dominated by the array factor (AF). Therefore, we assume that for a given sectoral range $(\theta_l, \theta_u)$ and $(\phi_l, \phi_u)$, the variation in element pattern (i.e., the radiation pattern of an individual reflective element in the tunable reflective array) is negligible. In other words, $E_{ep,\theta}(\theta, \phi) \approx c''$, where c'' is some constant for $\theta_l \leq \theta \leq \theta_u; \phi_l \leq \phi \leq \phi_u$. Therefore, the objective of beam shaping can be simplified as (constants normalized to unity), $$AF(\theta,\phi)=1 \text{ for } \theta_l \leq \theta \leq \theta_u; \phi_l \leq \phi \leq \phi_u; \tag{3}$$

$$AF(\theta,\phi)=0 \text{ for other values of } \theta \text{ and } \phi; \tag{4}$$

We consider the beamforming coefficients $\alpha_{rc}$ to be separable in two orthogonal dimensions Y and Z, i.e., we assume that any beamforming coefficient $\alpha_{rc}$ may be written as $\alpha_{rc}=\alpha_r \cdot \alpha_c$, where $\alpha_r$ and $\alpha_c$ are r- and c-oriented (or equally y- and z-oriented) components of the beamforming coefficients, respectively. Then, the array factor AF in (3) & (4) can be expressed as $$AF(\theta, \phi) = \left(\sum_{c=c_L}^{c_U} a_c e^{jkcd_y(\sin\theta_t \sin\phi_t + \sin\theta\sin\phi)}\right)\left(\sum_{r=r_L}^{r_U} a_r e^{jkrd_z(\cos\theta_t + \cos\theta)}\right), \tag{5}$$

where k is a wavenumber (or propagation constant), $c_L$ and $c_U$ are, respectively, lower and upper limits of the array parameter c, $r_L$ and $r_U$ are, respectively, lower and upper limits of the array parameter r, $d_y$ is a distance between (phase) center points of adjacent reflective elements along y-direction, $d_z$ is a distance between (phase) center points of adjacent reflective elements along z-direction, e is the Euler's number and j is the imaginary unit.

To simplify the following analysis, we further define two auxiliary parameters $\xi_y$ and $\xi_z$ as $$\xi_y = -\frac{k}{2\pi}d_y(\sin\theta_t\sin\phi_t + \sin\theta\sin\phi), \tag{6}$$

$$\xi_z = -\frac{k}{2\pi}d_z(\cos\theta_t + \cos\theta). \tag{7}$$

We observe based on (5)-(7) that $AF(\xi_y, \xi_z) = AF(\xi_y) AF(\xi_z)$, where $AF(\xi_y) \leftrightarrow \alpha_c$ and $AF(\xi_z) \leftrightarrow \alpha_r$ are two separable one-dimensional Discrete-Time Fourier Transform (DTFT) pairs. Let $\xi_{y,l}$ and $\xi_{y,u}$ correspond to the lower and upper limits of $\xi_y$ as calculated from (6) for a given range of $(\theta_l, \theta_u)$ and $(\phi_l, \phi_u)$. Similar (i.e., analogous) definition holds also for $\xi_{z,l}, \xi_{z,u}$ and $\xi_z$ defined in (7). We can express the inverse transform as $$a_c = \int_{\xi_{y,l}}^{\xi_{y,u}} e^{j2\pi\xi_y c} d\xi_y \text{ and } a_r = \int_{\xi_{z,l}}^{\xi_{z,u}} e^{j2\pi\xi_z r} d\xi_z. \quad (8)$$

The integrals of (8) may be simplified to yield following close forms:

$$a_c = \frac{1}{\sqrt{\gamma}} e^{j\pi c(\xi_{y,u}+\xi_{y,l})} (\xi_{y,u} - \xi_{y,l}) \text{sinc}(\pi c(\xi_{y,u} - \xi_{y,l})) \text{ for } c \in [c_L, c_U], \quad (9)$$

$$a_r = \frac{1}{\sqrt{\gamma}} e^{j\pi r(\xi_{z,u}+\xi_{z,l})} (\xi_{z,u} - \xi_{z,l}) \text{sinc}(\pi r(\xi_{z,u} - \xi_{z,l})) \text{ for } r \in [r_L, r_U], \quad (10)$$

where $$\gamma = \max_{r,c} |a_{rc}|$$

is the normalization factor and the total beamforming coefficient is $\alpha_{rc} = \alpha_r \cdot \alpha_c$. Partial one-dimensional array factors $AF(\xi_y)$ and $AF(\xi_z)$ may be simply calculated as $AF(\xi_y) = \text{DTFT}(\alpha_c)$ and $AF(\xi_z) = \text{DTFT}(\alpha_r)$. The total approximated array factor is then, $AF_a(\theta, \phi) = AF(\xi_y) AF(\xi_z)$ From (1)-(10), the difference between beam shaping using an RIS and using an active phased array may be clearly observed. Namely, in an IRS, the excitation for the radiating elements (i.e., antenna elements) is the external incident electromagnetic field, as opposed to a set of excitation signals received from a radio transmitter or transceiver electrically connected to the active phase array. Moreover, unlike in the case of a phased array, this excitation is, in general, not the same for all radiating elements (unless the incidence direction is fully orthogonal to the plane of the RIS). Since the excitation varies with each radiating element, the beamforming (or equally weighing) coefficients are expected to be a function of, not only the required angular coverage, but also of the angle of arrival (or equally incidence direction) and interelement spacing, as can also be observed from (1)-(10).

Figure 3A:
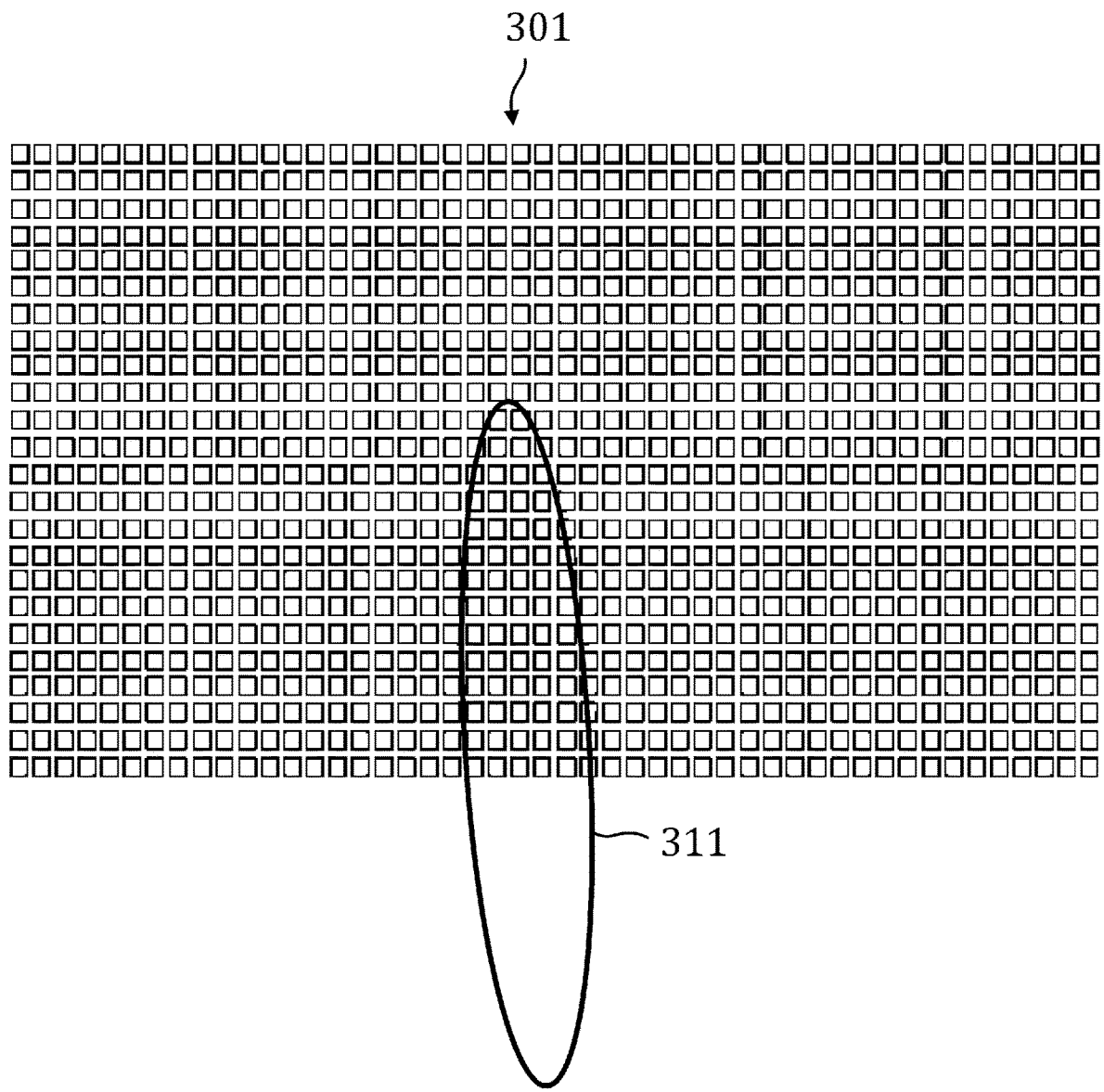
FIGS. 3A and 3B illustrate, respectively, two alternative implementations of a tunable reflective array of a reconfigurable intelligent surface.
Figure 3B:
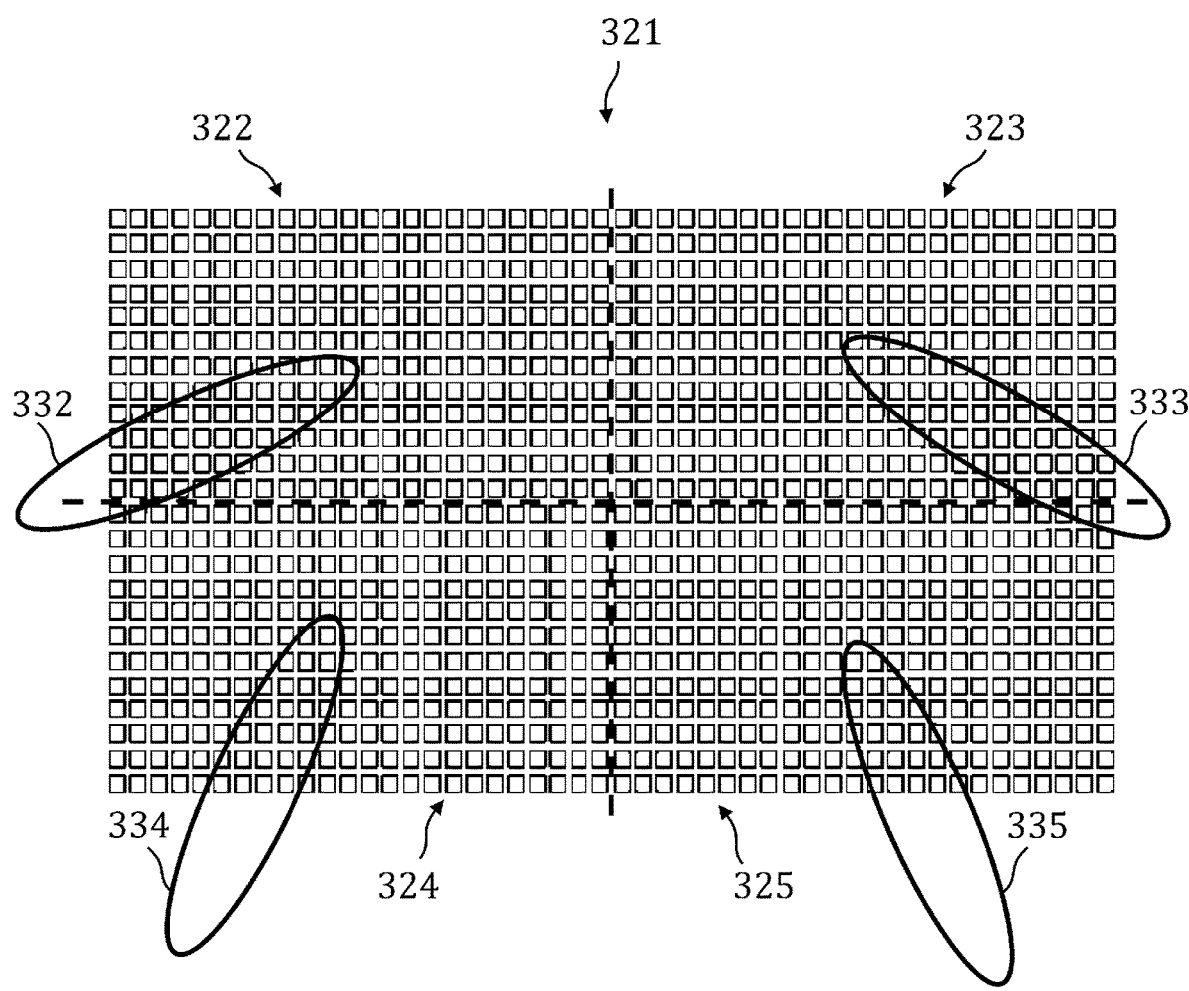

FIGS. 3A and 3B illustrate two alternative implementations 301, 321 of a tunable reflective array of a RIS. The RIS in question may be deployable between one of the terminal devices 100, 102 and the access node 104 of FIG. 1. Either of the tunable reflective arrays 301, 321 may be used with the RIS 201 of FIGS. 2A and 2B.

FIG. 3A illustrates a tunable reflective array 301 similar to the one shown in FIGS. 2A and 2B and is provided here merely for comparison. The tunable reflective array 301 comprises a single reflective panel which is used for implementing a single beam at a time. FIG. 3B illustrates a tunable reflective array 321 comprising a plurality of reflective subpanels 322 to 325 which are used for implementing a respective plurality of beams 332 to 335 at a given time. Specifically, FIG. 3B illustrates an exemplary tunable reflective array 321 with four reflective subpanels 322 to 325 (though other number of reflective subpanels may be employed in other embodiments). Each of the plurality of reflective subpanels 322 to 325 may be independently controllable by the apparatus (i.e., a computing device) of the RIS by changing the configuration (i.e., tuning) of the tunable impedance load circuits electrically connected to the reflective elements of the subpanels. Each of the plurality of (different) beams 332 to 335 produced by the plurality of subpanels 322 to 325 may be used, e.g., for serving a different terminal device. Any of the features described in connection with FIGS. 2A and 2B for the tunable reflective array 210 (corresponding to a singular reflective panel) may apply, mutatis mutandis, for each individual reflective subpanel 322 to 325 of the tunable reflective array 321.

Figure 4:
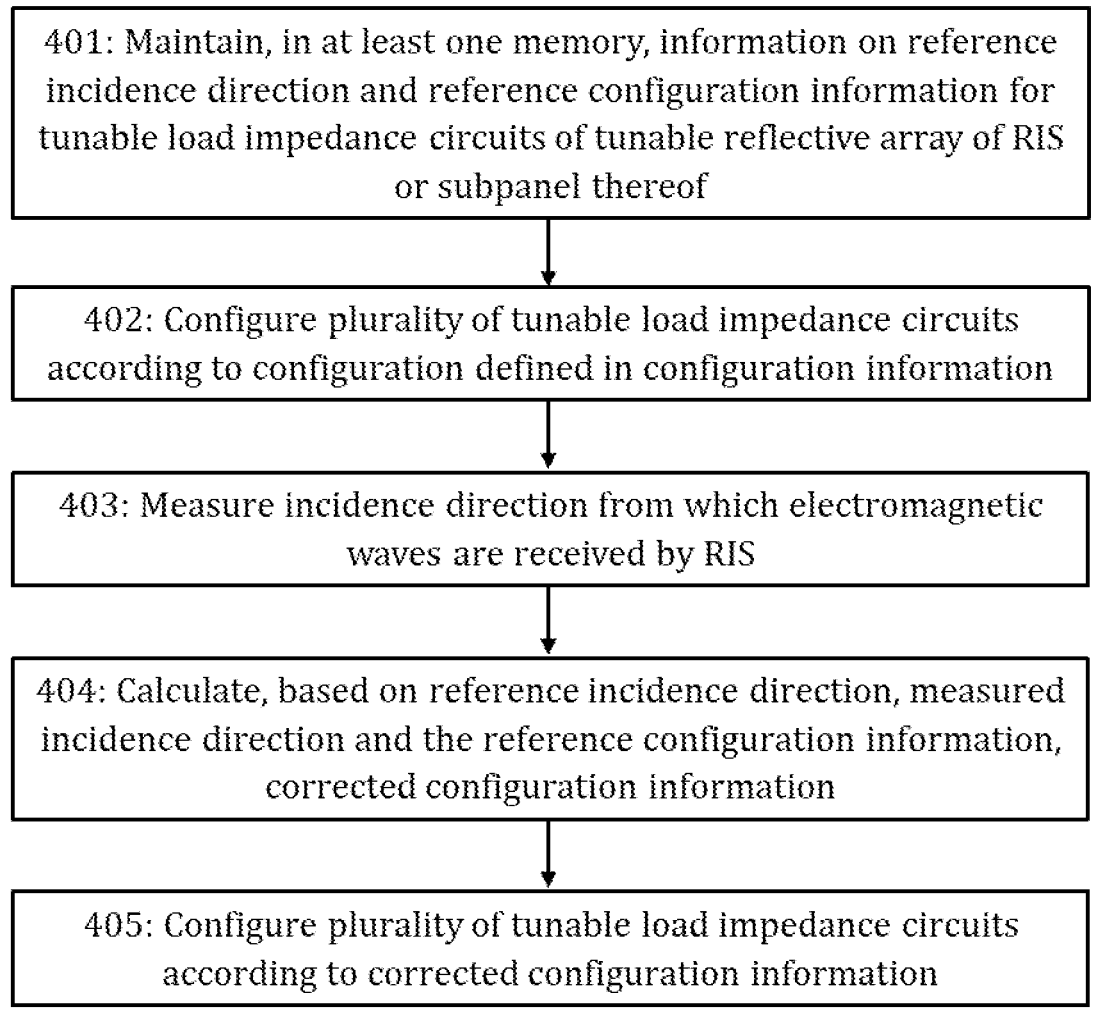

In some embodiments, the RIS may be configured to dynamically switch from the single panel operation of FIG. 3A to the multipanel operation of FIG. 3B and vice versa. The switching from the multipanel operation to the single panel operation may be triggered, for example, when all the resources are scheduled for a single terminal device. The switching may be controlled remotely by an access node using a control channel FIG. 4 illustrates a process according to embodiments for correcting an initial configuration of a tunable reflective array of an RIS based on a detected change in the incidence direction of electromagnetic waves. The process of FIG. 4 may be carried out by an apparatus (e.g., a computing device) of the RIS such as the apparatus 204 of FIG. 2A. The RIS and its elements may be defined as described in connection with any of the embodiments discussed in relation to any of FIGS. 2A, 2B, 3A and 3B. The process of FIG. 4 may be equally applicable to a downlink direction (i.e., the case where electromagnetic waves are received from an access node and reflected to a terminal device) and an uplink direction (i.e., the case where electromagnetic waves are received from a terminal device and reflected to an access node). It should be noted that that the uplink and downlink channel formed via the RIS experience reciprocal channel gain without the need for adjusting load impedances to shift the signal direction.

Referring to FIG. 4, the apparatus maintains, in block 401, in at least one memory, information on a reference incidence direction and reference configuration information defining a plurality of configurations of a plurality of tunable load impedance circuits of the tunable reflective array of the RIS for implementing a plurality of different reflection beams when reception occurs from the reference incidence direction. In other words, each configuration of the plurality of tunable load impedance circuits of the tunable reflective array of the RIS correspond to a single reflection beam which is specific to reception from the reference incidence direction. The reference incidence direction may be related to reception from a particular radio transmitter or transceiver.

In some alternative embodiments, the reference configuration information may define a plurality of configurations of a plurality of tunable load impedance circuits of a subpanel of a tunable reflective array of a reconfigurable intelligent surface for implementing a plurality of different reflection beams when reception occurs from the reference incidence direction. In other words, the reference configuration information may pertain to a particular subpanel of the tunable reflective array of the RIS, as opposed to the whole tunable reflective array.

The reference incidence direction may be defined using elevation and azimuth angles ($\theta_r$ & $\phi_r$, respectively) or using one of elevation and azimuth angles (in the case of a one-dimensional tunable reflective array). The elevation angle may be defined here as an angle relative a plane of the tunable reflective array of the RIS (either 0° or 90° elevation corresponding to said plane depending on the definition). The reference incidence direction may be defined specifically assuming reception via a center point of the tunable reflective array or a subpanel thereof. The reference incidence direction may correspond to the latest information regarding the location of the radio transmitter relative to the RIS.

Each of the plurality of configurations maintained in said at least one memory may comprise an impedance load matrix. A plurality of elements of each impedance load matrix may define load impedances implementable by the plurality of tunable impedance load circuits, respectively. The size of each of the plurality of impedance load matrices is equal to the size of the tunable reflective array (i.e., size in terms of number of elements). In other words, if the tunable reflective array is a R×C array (where R and C are positive integers), each of the plurality of load matrices has the size of R×C or C×R.

Additionally, the apparatus may maintain, in the at least one memory, a plurality of beam codebooks. The plurality of beam codebooks may define a plurality of sets of beamforming coefficients for the tunable reflective array. The plurality of sets of beamforming coefficients define at least phases (possibly also gains) inducible by the plurality of tunable load impedance circuits for implementing the plurality of reflection different beams. In other words, each beam codebook defines phases (optionally also gains) associated with electromagnetic waves reflected (re-radiated) by the plurality of reflective elements of the tunable reflective array for implementing a particular reflection beam of the plurality of different reflection beams. The phase and optionally gain values may be defined, for example, using complex numbers. A single complex number may be used for providing information on both phase and gain (the phase corresponding to the phase or polar angle of the complex number and the gain corresponding to the magnitude of the complex number). The plurality of beam codebooks may be defined as matrices. The size of each of the plurality of beam codebooks may be equal to the size of the tunable reflective array (i.e., size in terms of number of elements). In other words, if the tunable reflective array is a R×C array (where R and C are positive integers), each of the plurality of beam codebooks has the size of R×C or C×R.

Each beam codebook may be associated with a corresponding load impedance matrix. A given beam codebook may be derivable based on a corresponding load impedance matrix and vice versa. Thus, only one of the two may be maintained in the at least one memory in some embodiments.

The apparatus configures, in block 402, the plurality of tunable load impedance circuits according to a configuration defined in the configuration information. In other words, the apparatus adjusts the tuning of the plurality of tunable load impedance circuits so as to implement a particular reflection beam (assuming reception occurs from the reference incidence direction).

The apparatus measures, in block 403, an incidence direction from which electromagnetic waves are received by the RIS. The incidence direction may be measured using, for example, a radio-based method such as using a localization technique or a method employing geometrical calculations based on measurements by a camera or a laser.

More specifically, the incidence angle may be measured, for example, using one of the following methods.

According to a first exemplary method, one of the RIS or access node (or other radio transmitter or transceiver for transmission via the RIS) transmits a pre-defined reference signal while the other of the RIS and the access node receives the pre-defined reference signal via the tunable reflective array (in the case of the RIS) or a separate antenna array (in either case) and subsequently carries out an angle-of-arrival (AoA) estimation technique based on the received pre-defined reference signal. For example, the AoA estimation may be carried out by measuring the time difference of arrival (TDoA) among the plurality of tunable reflective elements of the tunable reflective array or among the plurality of antenna elements of the antenna array. The incidence angle (i.e., the AoA) may be determined based on the TDoA.

According to a second exemplary method, an optical direction of arrival technique may be used to estimate the incidence angle. In this case, one of the RIS and the access node (or other radio transmitter or transceiver for transmission via the RIS) may be equipped with at least one laser and the other with an optical sensor array. One of the RIS and the access node (or other radio transmitter or transceiver for transmission via the RIS) may emit one or more laser pulses using at least one laser while the other one of the RIS and the access node may measure, using the optical sensor array, the one or more laser pulses. Based on these measurements, the TDoA may be estimated. Moreover, the AoA may be estimated based on the TDoA.

Ideally, this measured incidence direction would correspond to the reference incidence direction. However, this may not always be the case, as was described already. For example, the radio transmitter (or transceiver) targeting the RIS may be a mobile radio transmitter as used commonly, e.g., in D2D and V2V communications or the orientation of the RIS may have changed, e.g., due weather conditions.

Similar to the reference incidence direction, the measured incidence direction may be defined using elevation and azimuth angles ($\theta'_r$ & $\phi'_r$, respectively) or using one of elevation and azimuth angles (in the case of a one-dimensional tunable reflective array). The measured incidence direction may be defined specifically assuming reception via a center point of the tunable reflective array or a subpanel thereof.

The apparatus calculates, in block 404, based on the reference incidence direction, the measured incidence direction and the reference configuration information, corrected configuration information defining a plurality of corrected configurations of the plurality of tunable load impedance circuits for implementing the plurality of different reflection beams when reception occurs from the measured incidence direction.

The apparatus (re)configures, in block 405, the plurality of tunable load impedance circuits according to a corrected configuration defined in the corrected configuration information. In other words, the apparatus adjusts the current tuning of the plurality of tunable load impedance circuits so as to implement a particular reflection beam assuming reception occurs from the measured incidence direction.

In some embodiments, block 402 may be omitted. In other words, the apparatus may not initially configure the plurality of tunable load impedance circuits according to any configuration defined in the configuration information. If block 402 is omitted, block 405 may correspond to configuring (as opposed to reconfiguring) the plurality of tunable load impedance circuits according to a corrected configuration defined in the corrected configuration information.

The operation described in connection with FIG. 4 may correspond to operation for a particular time slot t. A particular radio transmitter or transceiver (e.g., an access node or a terminal device) may be scheduled to use the RIS at said particular time slot t. At the next time slot, the operation in blocks 401 to 405 may be repeated though the radio transmitter or transceiver scheduled to use the RIS nay be different and thus the reference incidence direction may also be different than before. In general, the apparatus may maintain, in said at least one memory, reference incidence direction and reference configuration information (and/or a set of beam codebooks) for one or more radio transmitter or transceivers.

In embodiments where the plurality of tunable load impedance circuits are tunable load impedance circuits of the subpanel of the RIS, the apparatus may repeat the steps described in connection with blocks 401 to 405 for one or more further subpanels of the RIS. The one or more further subpanels of the RIS may be associated with a different or same reference incidence direction as said subpanel.

Figure 5:
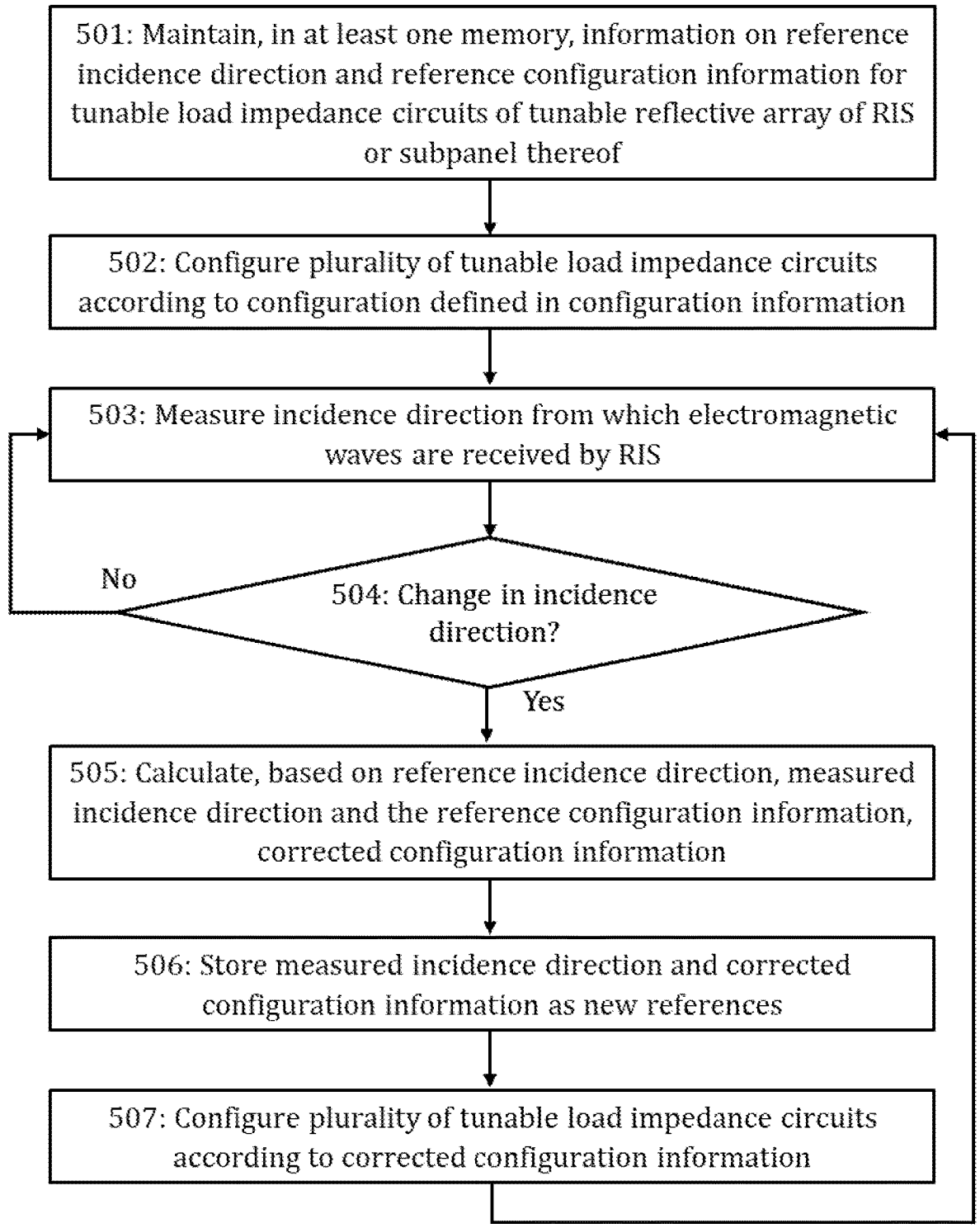

FIG. 5 illustrates another process according to embodiments for correcting an initial configuration of a tunable reflective array of an RIS based on a detected change in the incidence direction of electromagnetic waves. The process of FIG. 5 may be carried out by an apparatus (e.g., a computing device) of the RIS such as the apparatus 204 of FIG. 2A. The RIS and its elements may be defined as described in connection with any of the embodiments discussed in relation to any of FIGS. 2A, 2B, 3A and 3B.

The process of FIG. 5 corresponds to a large extent to the process of FIG. 4. Therefore, any features and/or definitions discussed in connection with FIG. 4 may apply, mutatis mutandis, for the process of FIG. 5, unless otherwise explicitly stated. Specifically, the initial blocks 501 to 503 of the process of FIG. 5 may correspond fully to blocks 401 to 403 of FIG. 4 and thus not discussed for brevity.

Following the measuring of the incidence direction of electromagnetic waves in block 503, the apparatus determines, in block 504, whether or not the measured incidence direction differs from the reference incidence direction (maintained in at least one memory in block 501) at least to an extent defined by one or more pre-defined criteria. The one or more pre-defined criteria may define, for example, a first threshold for difference between elevation angles of the measured and reference incidence directions and/or a second threshold for a difference between azimuth angles of the measured and reference incidence directions. Alternatively, the one or more pre-defined criteria may define a combined threshold for a difference parameter defined to quantify difference between the measured and reference incidence directions (being dependent, e.g., on azimuth and elevation angles defined for the measured and reference incidence directions).

In response to the measured incidence direction differing from the reference incidence direction at least to the extent defined by the one or more pre-defined criteria in block 504, the apparatus calculates, in block 505, corrected configuration information based on the reference incidence direction, the measured incidence direction and the reference configuration information, similar to as described above in connection with block 404 of FIG. 4.

In response to the measured incidence direction failing to differ from the reference incidence direction at least to the extent defined by the one or more pre-defined criteria in block 504, the apparatus may perform no corrections to the reference incidence direction and the reference configuration information. The measurement of the incidence direction in block 503 may be repeated after a pre-defined amount time (as indicated by the arrow connecting block 504(No) back to block 503).

The apparatus stores, in block 506, the measured incidence direction and the corrected configuration information to the at least one memory. Specifically, the measured incidence direction and the corrected configuration information may be defined, in said at least one memory, as a new reference incidence direction and new reference configuration information. Thus, when the process of blocks 503 to 507 is repeated, the previously measured incidence direction acts as the new reference incidence direction and the corrected configuration information is used as the reference configuration information.

The apparatus (re) configures, in block 507, the plurality of tunable load impedance circuits according to the corrected configuration information, similar to as described above in connection with block 405 of FIG. 4.

In some embodiments, only one of the features discussed in connection with block 504 and block 506 may be implemented.

Figure 6:
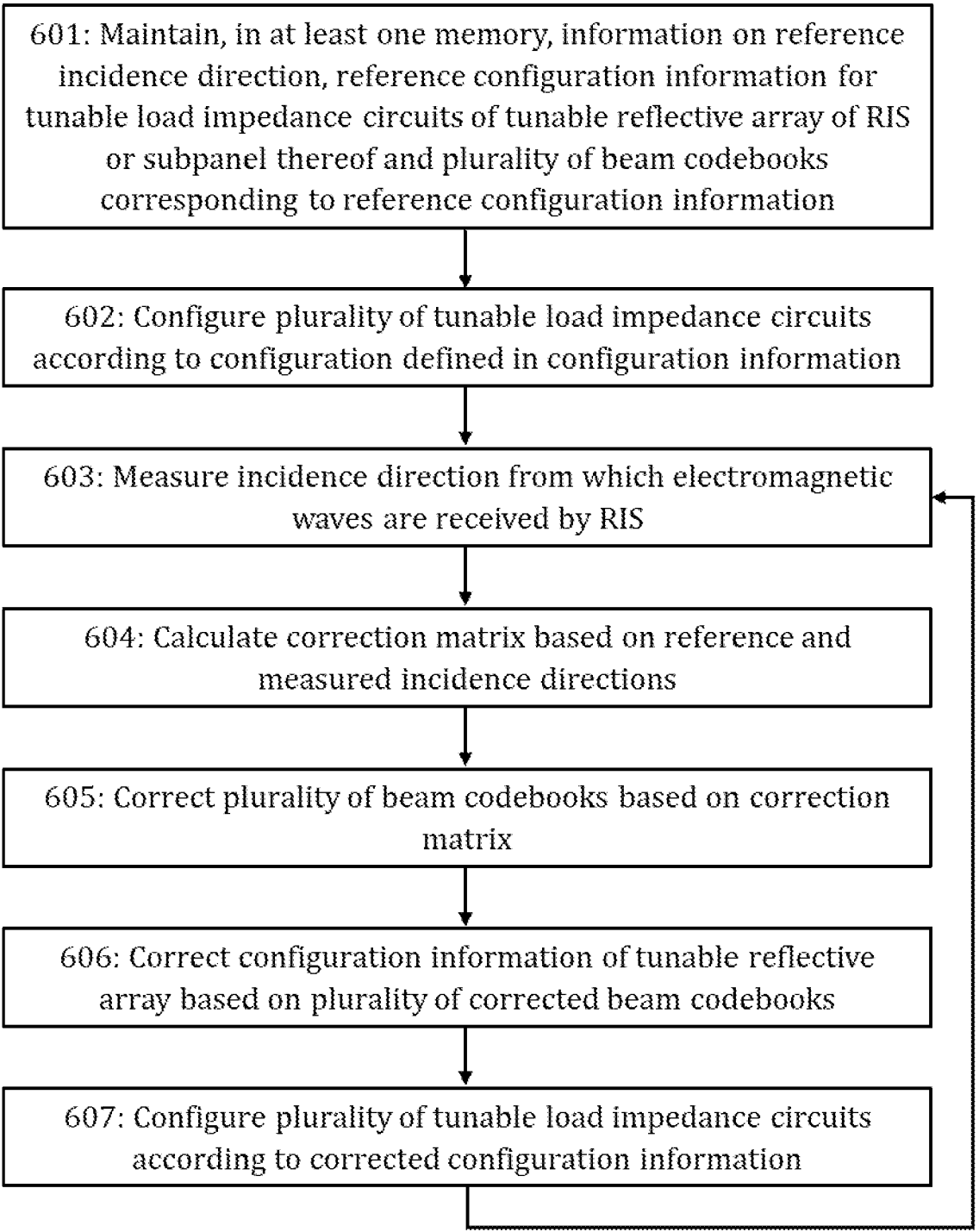

FIG. 6 illustrates another process according to embodiments for correcting an initial configuration of a tunable reflective array of an RIS based on a detected change in the incidence direction of electromagnetic waves. The process of FIG. 6 may be carried out by an apparatus (e.g., a computing device) of the RIS such as the apparatus 204 of FIG. 2A. The RIS and its elements may be defined as described in connection with any of the embodiments discussed in relation to any of FIGS. 2A, 2B, 3A and 3B.

FIG. 6 illustrates a more detailed implementation of the process of FIG. 4.

Therefore, any of the features discussed above in connection with FIG. 4 may apply, mutatis mutandis, also here. In some embodiments, the more detailed implementation of FIG. 6 may be combined with one or more additional functionalities discussed in connection with FIG. 5 (namely, the functionalities discussed in connection with blocks 503 and/or 505 of FIG. 5).

Referring to FIG. 6, the apparatus maintains, in block 601, in at least one memory, information on a reference incidence direction and reference configuration information defining a plurality of configurations (e.g., load impedance matrices) of a plurality of tunable load impedance circuits of the tunable reflective array of the RIS for implementing a plurality of different reflection beams when reception occurs from the reference incidence direction, similar to block 401 of FIG. 4. Additionally, it is assumed here that the apparatus also maintains, in the at least one memory, a plurality of beam codebooks defining a plurality of sets of beamforming coefficients for the tunable reflective array, as also mentioned above. The plurality of beam codebooks may be defined as matrices having a size defined by the number of reflective elements in the tunable reflective array.

The action pertaining to blocks 602, 603 of FIG. 6 may be carried out as described in connection with blocks 402, 403 of FIG. 4. Similar to as described in connection with FIG. 4, block 602 may be omitted in some embodiments.

The apparatus calculates, in block 604, a correction matrix based on the reference incidence direction and the measured incidence direction. Here, the correction matrix defines a plurality of correction coefficients for the plurality of sets of beamforming coefficients (as defined in the plurality of beam codebooks). Each element of the correction matrix represents a correction coefficient for a given beamforming coefficient associated with a corresponding tunable impedance load circuit. An example of a specific mathematical formulation of the correction matrix is discussed later.

In the following, an equation for calculating the correction matrix is derived. Difference terms $\Delta\xi_y$ and $\Delta\xi_z$ for y- and z-directions based on the reference and measured incidence directions (defined using elevation and azimuth angles as $\theta_t$ & $\phi_t$ and $\theta'_t$ & $\phi'_t$, respectively) may be written as:

$$\Delta\xi_y = -\frac{d_y}{\lambda}(\sin\theta'_t \sin\phi'_t - \sin\theta_t \sin\phi_t), \quad (11)$$

$$\Delta\xi_z = -\frac{d_z}{\lambda}(\cos\theta'_t - \cos\theta_t). \quad (12)$$

Here, the symbols may be defined as was described above in connection with (1)-(10). Moreover, the beamforming coefficients $\alpha_c$ and $\alpha_r$ defined for the r- and c-array directions may be defined as follows:

$$\alpha'_c = \alpha_c e^{-jkcd_y(\sin\theta't\sin\phi't - \sin\theta t\sin\phi t)}, \quad (13)$$

$$\alpha'_r = \alpha_r e^{-jkrd_z(\cos\theta't - \cos\theta t)}. \quad (14)$$

Based on (13) and (14), the (total) corrected beamforming coefficients $\alpha'_{rc}$ may be written as $$\alpha'_{rc} = \alpha'_c \alpha'_r = \alpha_{rc} e^{-jk[cd_y(\sin\theta't\sin\phi't - \sin\theta t\sin\phi t) + rd_z(\cos\theta't - \cos\theta t)]}, \quad (15)$$

Finally, the elements $\omega_{rc}$ of the correction matrix $\Omega$ with size R×C may be defined based on (15) as $$\omega_{rc} = \frac{a'_{rc}}{a_{rc}} = e^{-jk[cd_y(\sin\theta'_t\sin\phi'_t - \sin\theta_t\sin\phi_t) + rd_z(\cos\theta'_t - \cos\theta_t)]}. \quad (16)$$

Thus, the apparatus may calculate the correction matrix in block 604 according to (16). Specifically, the apparatus may calculate a value for $\omega_{rc}$ according to (16) for each combination of r=1, 2, . . . , R and c=1, 2, . . . , C to acquire the full correction matrix $\Omega$.

The apparatus calculates, in block 605, the plurality of corrected configurations of the plurality of tunable load impedance circuits based on the plurality of beam codebooks and the correction matrix.

Specifically, the calculating of the plurality of corrected configurations of the plurality of tunable load impedance circuits based on the plurality of beam codebooks and the correction load impedance matrix in block 605 may comprise the following two steps. First, the apparatus may calculate, in block 605, a plurality of corrected beam codebooks by performing element-wise multiplication between the plurality of beam codebooks defined as matrices and the correction matrix. In other words, the apparatus performs the following calculation: A'=A°$\Omega$, where A is the beam codebook matrix with size R×C, $\Omega$ is the correction matrix with size R×C, A' is the corrected beam codebook matrix with size R×C and ° is the element-wise product operator. Second, the apparatus calculates, in block 605, the plurality of corrected configurations of the plurality of tunable load impedance circuits based on the plurality of corrected beam codebooks. In other words, the apparatus determines how the plurality of tunable load impedance circuits should be configured so as to implement phase shifts (and possibly gains) as defined in the plurality of corrected beam codebooks.

The apparatus (re) configures, in block 607, the plurality of tunable load impedance circuits according to a corrected configuration defined in the corrected configuration information, similar to as described in connection with block 405 of FIG. 4. In other words, the apparatus adjusts the current tuning of the plurality of tunable load impedance circuits so as to implement a particular reflection beam assuming reception occurs from the measured incidence direction.

As indicated with the arrow connecting block 607 back to block 603, the measurement of the incidence direction (block 603), the calculation of the correction matrix (block 604), the correcting of the beam codebooks (block 605), the correcting of the configuration information (block 606) and the reconfiguration of the plurality of tunable load impedance circuits (block 607) may be repeated periodically or regularly and/or in response to a specific trigger, e.g., in response to receiving a command from an access node via a control channel. Such a command may be received, for example, if there is a change in the access node or terminal device (or other transmitting entity) scheduled to use the RIS for transmission (and thus it is expected that the current reference incidence direction is no longer applicable or upto-date).

In some embodiments, the incidence direction measured in block 403 of FIG. 4, block 503 of FIG. 5 or block 603 of FIG. 6 may correspond, in a more general sense, to an effective or combined incidence angle defined based on a plurality of incidence directions, where the plurality of incidence directions may correspond, respectively, to a plurality of multipath components of the wireless channel. The plurality of multipath components may comprise a line-of-sight component and/or one or more non-line-of-sight components. In such case, the incidence direction of each multipath component can be accounted for in the measurement of the (effective or combined) incidence direction and in the calculation of the correction matrix (as described in block 604 of FIG. 6). The knowledge of incidence direction in such multipath channel setup together with the knowledge of the path gain for each of the paths may equivalent to channel state information (CSI). Therefore, instead of a plurality of path gains and path angles corresponding to the plurality of incidence directions, the apparatus may be provided with an estimated and/or quantized form of CSI. The CSI may be measured using the typical channel estimation techniques in wireless communications, e.g., least square (LS) or minimum mean squared error (MMSE). The apparatus may subsequently determine a correction matrix to be used by using a pre-defined lookup table and/or function which maps each CSI to a corresponding correction matrix.

As was described above, in some embodiments, the RIS may comprise a radio receiver or transceiver or provide a connection to an external radio receiver or transceiver for enabling reception (and possibly transmission) of control signaling via a control channel from one or more access nodes. This operation may be similar to operation of an integrated access and backhaul mobile termination (IAB-MT) entity. FIGS. 7A, 7B, 7C and 7D illustrate four processes involving reception of such control signaling for authentication & synchronization, configuration of the RIS, reflection beam selection and reference incidence direction selection (or equally or incidence beam selection or TRP selection), respectively. Any of the processes of FIGS. 7A, 7B, 7C and 7D may be carried out by an apparatus (e.g., a computing device) of the RIS such as the apparatus 204 of FIG. 2A. The RIS and its elements may be defined as described in connection with any of the embodiments discussed in relation to any of FIGS. 2A, 2B, 3A and 3B. The reception/transmission of signals, by the apparatus, via a radio receiver or transceiver over the control channel as described in connection with FIGS. 7A, 7B, 7C and 7D may be carried out using at least one (dedicated) antenna of the radio receiver or transceiver or via the tunable reflective array of the RIS (assumed in these embodiments to be electrically connected to the radio receiver or transceiver).

Figure 7A:
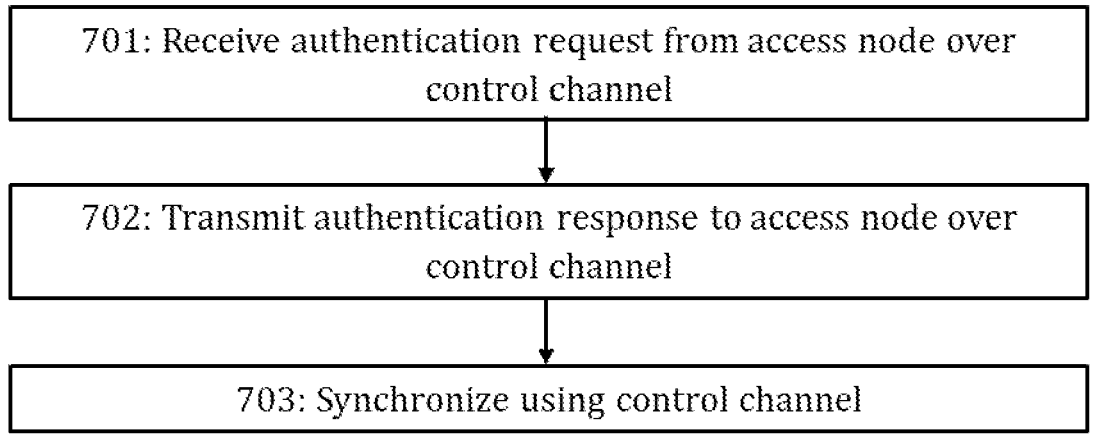

As the RIS is configured to receive and decode control signaling from one or more access nodes, the RIS may also need to be authenticated in the network. This authentication may be carried out as shown in FIG. 7A from the point of view of the apparatus comprised in the RIS. Here, it is assumed that the RIS comprises or is electrically connected to a radio transceiver.

In FIG. 7A, the apparatus first receives, in block 701, a request for authentication from an access node via a radio transceiver over a control channel. Thereafter, the apparatus transmits, in block 702, via the radio transceiver over the control channel, an authentication response to the access node. The authentication response may comprise specifically an international mobile subscribed identity (IMSI) of the RIS or other such mobile station identity of the RIS.

The apparatus may thereafter carry out synchronization, in block 703, with the $a_c$-cess node. Specifically, the apparatus may receive one or more network synchronization signals via the radio transceiver over the control channel so as to synchronize the RIS clock to the beam switching time slots defined by the network.

Figure 7B:
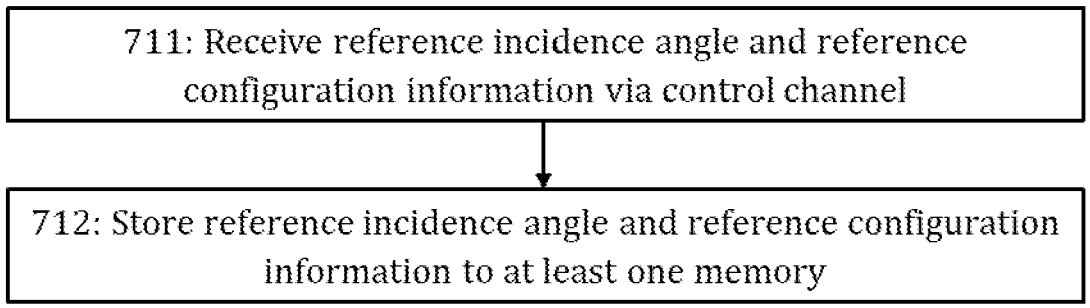

The process of FIG. 7B may be carried out before any of the processes of FIGS. 4 to 6 as it pertains to the reception of the information maintained in the at least one memory of the RIS in block 401 of FIG. 4, block 501 of FIG. 5 or block 601 of FIG. 6. Namely, the apparatus receives (and decodes), in block 711, information on a reference incidence direction and associated reference configuration information for the RIS via a radio receiver or transceiver from an access node over a control channel. The reference configuration information may be defined as described in connection with block 401 of FIG. 4. The information on the reference incidence angle and the associated reference configuration information may be acquired, by the access node, e.g., using angle of arrival estimation methods during transmission of a channel estimation pilot signal. Thereafter, the apparatus stores, in block 712, the reference incidence direction and the reference configuration information to the at least one memory.

Figure 7C:
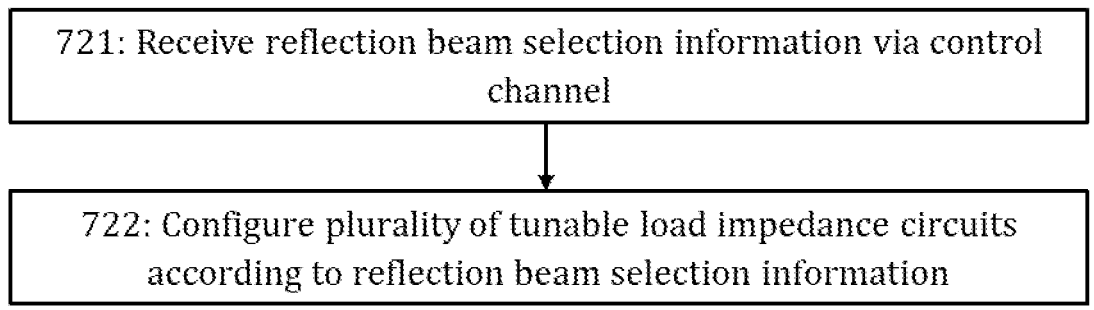

The process of FIG. 7C may be carried out after the reference incidence direction and the reference configuration information has been stored to the at least one memory of the apparatus of the RIS (e.g., according to the process of FIG. 7B or during installation or deployment of the RIS). In FIG. 7C, the apparatus receives (and decodes), in block 721, via a radio receiver or transceiver from an access node (or specifically a serving access node) over a control channel, reflection beam selection configuration information for configuring the plurality of tunable load impedance circuits according to a particular configuration defined in the configuration information (which is maintained in the at least one memory). Said particular configuration corresponds to a particular reflection beam implementable by the RIS. In other words, the access node may command the apparatus to change the configuration of the RIS to match the one specified in the reflection beam selection configuration information. The apparatus configures, in block 722, the plurality of tunable load impedance circuits of the RIS $a_c$-cording to the reflection beam selection configuration information so as to implement said particular reflection beam.

Referring to FIG. 7D, it is initially assumed that the apparatus maintains, in at least one memory, in block 731, information on a plurality of reference incidence directions and a plurality of reference incidence direction-specific sets of reference configuration information for the plurality of tunable impedance circuits of the tunable reflective array of the RIS (or a subpanel thereof). In other words, apparatus may maintain, in said at least one memory, any information described in connection with block 401 of FIG. 4 for a single reference incidence direction for multiple reference incident directions. The plurality of reference incidence directions may be associated with a respective plurality of radio transmitters (or transceivers) or more specifically access nodes. Thus, the apparatus is configured here to reflect electromagnetic waves received from a plurality of different access nodes, where electromagnetic waves received from any of the plurality of different access nodes may be reflected using a plurality of different reflection beams to a plurality of different radio receivers (or transceivers).

In some embodiments, the information described in connection with block 731 (or a part thereof) may have been received previously via a radio receiver or transceiver over a control channel from an access node. This may correspond to repeating the process of FIG. 7B a plurality of times for a plurality of different reference incidence directions. Said information may have been acquired, by the access node, e.g., using angle of arrival estimation methods during transmission of a channel estimation pilot signal. Additionally or alternatively, said information (or a part thereof) may have been stored during installation or deployment of the RIS.

The apparatus receives (and decodes), in block 732, via a radio receiver or transceiver from an access node (or specifically a serving access node) over a control channel, incidence direction selection configuration information for configuring the plurality of tunable load impedance circuits to employ a particular reference incidence direction-specific set of reference configuration information maintained in the at least one memory. The incidence direction selection configuration information may be equally called incidence beam selection configuration information or source access node configuration information. The incidence direction selection configuration information comprises at least information on a particular reference incidence direction. Said particular reference incidence direction may correspond to a particular currently active access node (or other radio transmitter), i.e., an access node (or other radio transmitter) which is currently connected to the RIS.

The apparatus configures, in block 733, the plurality of tunable load impedance circuits of the RIS according to the incidence direction selection configuration information so as to enable reception and reflection of electromagnetic waves from a particular reference incidence direction (or from a particular access node assumed to be located in that particular reference incidence direction).

The particular configuration for the plurality of tunable load impedance circuits may be selected from the reference incidence direction-specific set of reference configuration information, for example, according to the process described in connection with FIG. 7C.

One example use case for the process of FIG. 7D is a multi-TRP deployment with dynamic point selection, e.g., in an indoor factory, where depending on which TRP is selected for transmission, the RIS can be associated to a new reference incidence direction. In some embodiments, messages 721, 732 may be combined into a single message.

Upon reception of such a combined message over the control channel from the access node, the configuration processes of blocks 722, 733 may be carried out one after another or in parallel. In other words, the reflection beam selection and reference incidence direction selection may be carried out substantially simultaneously.

In some alternative embodiments, messages 721, 732 or a combination thereof may define a schedule defining periodic or regular switching between different individual reflection beams defined for a certain reference incidence direction and/or different reference incidence directions, similar to as will be described below in connection with FIG. 8. The apparatus may, then, configure the plurality of tunable load impedance circuits according to said schedule.

While FIGS. 7A, 7B, 7C and 7D illustrate processes performed by an apparatus for an RIS in communication with an access node, it should be appreciated that corresponding processes could be provided also for the access node side. In other words, an access node may transmit an authentication request over a control channel to the RIS and subsequently receive an authentication response over the control channel from the RIS, transmit information on a reference incidence direction and associated reference configuration information for the RIS over the control channel to the RIS, transmit reflection beam selection information over the control channel to the RIS and/or transmit reference incidence direction selection information over the control channel to the RIS.

In the case of a simpler RIS according to embodiments with no radio receiver or transceiver (and thus being unable to use a control channel for receiving control data from an access node), the functionalities described in connection with FIGS. 7A and 7B may be performed during installation or deployment of the RIS by connecting a computer (using a wired or wireless link) to the RIS. It should be noted that synchronization may be useful also with such simpler RIS since it enables, e.g., periodic switching among reflection beam patterns in synchronization with the network.

As was described above, in some embodiments, the RIS may comprise no radio receiver or transceiver and provide no connection to an external radio receiver or transceiver. In such embodiments, the dynamic reflection beam selection as described in connection with FIG. 7C and the dynamic (reference) incidence direction (or incidence beam or TRP) selection as described in connection with FIG. 7D is not possible. FIG. 8 provides an alternative process for enabling such a simpler RIS with no access to an access node via a control channel to use different reflection beams corresponding to one or more different reference incidence directions configured to it. The process of FIG. 8 may be carried out by an apparatus (e.g., a computing device) of the RIS such as the apparatus 204 of FIG. 2A. The RIS and its elements may be defined as described in connection with any of the embodiments discussed in relation to any of FIGS. 2A, 2B, 3A and 3B.

Referring to FIG. 8, the apparatus initially maintains, in block 801, in at least one memory, information on one or more reference incidence directions and one or more associated reference incidence direction-specific sets of reference configuration information defining of a plurality of configurations of a plurality of tunable load impedance circuits of the tunable reflective array of the RIS for implementing a plurality of different reflection beams when reception occurs from any of the one or more reference incidence directions. Block 801 may correspond fully to block 401 of FIG. 4.

Moreover, the apparatus maintains, in block 802, in the at least one memory, reflection beam and/or reference incidence direction scheduling configuration information defining periodical or regular scheduling of different reflection beams for which configurations of the plurality of tunable load impedance circuits is defined in the configuration information. The scheduled reflection beams may be associated altogether with said one or more reference incidence directions (i.e., the beam scheduling may involve, in some cases, reflection beams relating to multiple different reference incident directions). The reflection beam scheduling and/or reference incidence direction configuration information may have been stored to the at least one memory, for example, during installation or deployment of the RIS.

The apparatus configures, in block 803, the plurality of tunable load impedance circuits according to the beam scheduling and/or reference incidence direction configuration information. In other words, the reflection beam of the RIS is switched according to a pre-defined schedule defined by the beam scheduling configuration information. The configuration in block 803 may be carried out continuously in parallel with any of the processes of FIGS. 4 to 6. To give a simplistic example, in the case of a two-TRP setup (i.e., configuration of the RIS to employ two different reference incidence directions), a first set of reflection beams associated with a first reference incidence angle may be swept first followed by a sweep of a second set of reflection beams associated with a second reference incidence angle.

The blocks, related functions, and information exchanges described above by means of FIGS. 4 to 6, 7A, 7B, 7C, 7D and 8 are in no absolute chronological order, and some of them may be performed simultaneously or in an order differing from the given one. Other functions can also be executed between them or within them, and other information may be sent and/or received, and/or other mapping rules applied. Some of the blocks or part of the blocks or one or more pieces of information can also be left out or replaced by a corresponding block or part of the block or one or more pieces of information.

In embodiments, the at least one processor, the memory, and the computer program code form processing means or comprises one or more computer program code portions for carrying out one or more operations according to any one of the embodiments of FIGS. 2A, 2B, 3A, 3B, 4 to 6, 7A, 7B, 7C, 7D and 8 or operations thereof.

In an embodiment, at least some of the processes described in connection with of FIGS. 2A, 2B, 3A, 3B, 4 to 6, 7A, 7B, 7C, 7D and 8 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 2A, 2B, 3A, 3B, 4 to 6, 7A, 7B, 7C, 7D and 8 or operations thereof.

According to an aspect, there is provided an apparatus (e.g., a computing device) comprising means for performing:

maintaining, in at least one memory, information on a reference incidence direction and reference configuration information defining a plurality of configurations of a plurality of tunable load impedance circuits of a tunable reflective array of a reconfigurable intelligent surface or a subpanel thereof for implementing a plurality of different reflection beams when reception occurs from the reference incidence direction;

measuring an incidence direction from which electromagnetic waves are received by the reconfigurable intelligent surface;

calculating, based on the reference incidence direction, the measured incidence direction and the reference configuration information, corrected configuration information defining a plurality of corrected configurations of the plurality of tunable load impedance circuits for implementing the plurality of different reflection beams when reception occurs from the measured incidence direction; and configuring the plurality of tunable load impedance circuits according to a corrected configuration defined in the corrected configuration information.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chipset (procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 2A, 2B, 3A, 3B, 4 to 6, 7A, 7B, 7C, 7D and 8 may be carried out by executing at least one portion of a computer program comprising corresponding instructions. The computer program may be provided as a computer readable medium comprising program instructions stored thereon or as a non-transitory computer readable medium comprising program instructions stored thereon. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

A computer program stored in a computer-readable storage medium, the program comprising software code for performing the steps of:

maintaining, in at least one memory, information on a reference incidence direction and reference configuration information defining a plurality of configurations of a plurality of tunable load impedance circuits of a tunable reflective array of a reconfigurable intelligent surface or a subpanel thereof for implementing a plurality of different reflection beams when reception occurs from the reference incidence direction;

measuring an incidence direction from which electromagnetic waves are received by the reconfigurable intelligent surface;

calculating, based on the reference incidence direction, the measured incidence direction and the reference configuration information, corrected configuration information defining a plurality of corrected configurations of the plurality of tunable load impedance circuits for implementing the plurality of different reflection beams when reception occurs from the measured incidence direction; and configuring the plurality of tunable load impedance circuits according to a corrected configuration defined in the corrected configuration information.

A computer readable storage medium having a computer program embodied therewith, wherein the computer program executable by a processor to cause the processor to perform a method:

maintaining, in at least one memory, information on a reference incidence direction and reference configuration information defining a plurality of configurations of a plurality of tunable load impedance circuits of a tunable reflective array of a reconfigurable intelligent surface or a subpanel thereof for implementing a plurality of different reflection beams when reception occurs from the reference incidence direction;

measuring an incidence direction from which electromagnetic waves are received by the reconfigurable intelligent surface;

calculating, based on the reference incidence direction, the measured incidence direction and the reference configuration information, corrected configuration information defining a plurality of corrected configurations of the plurality of tunable load impedance circuits for implementing the plurality of different reflection beams when reception occurs from the measured incidence direction; and configuring the plurality of tunable load impedance circuits according to a corrected configuration defined in the corrected configuration information.

A computer program product embodied on a distribution medium readable by a computer and comprising program instructions which, when loaded into an apparatus, execute a method comprising:

maintaining, in at least one memory, information on a reference incidence direction and reference configuration information defining a plurality of configurations of a plurality of tunable load impedance circuits of a tunable reflective array of a reconfigurable intelligent surface or a subpanel thereof for implementing a plurality of different reflection beams when reception occurs from the reference incidence direction;

measuring an incidence direction from which electromagnetic waves are received by the reconfigurable intelligent surface;

calculating, based on the reference incidence direction, the measured incidence direction and the reference configuration information, corrected configuration information defining a plurality of corrected configurations of the plurality of tunable load impedance circuits for implementing the plurality of different reflection beams when reception occurs from the measured incidence direction; and configuring the plurality of tunable load impedance circuits according to a corrected configuration defined in the corrected configuration information.

Even though the invention has been described above with reference to examples according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

What is claimed is:

1. An apparatus comprising:
   at least one processor, and
   at least one memory for storing instructions to be executed by the processor, wherein the at least one memory and the instructions are configured to, with the at least one processor, cause the apparatus at least to perform:
   maintaining, in said at least one memory, information on a reference incidence direction and reference configuration information defining a plurality of configurations of a plurality of tunable load impedance circuits of a tunable reflective array of a reconfigurable intelligent surface or a subpanel thereof for implementing a plurality of different reflection beams when reception occurs from the reference incidence direction;
   maintaining, in said at least one memory, a plurality of beam codebooks defining a plurality of sets of beamforming coefficients for the tunable reflective array, wherein the plurality of sets of beamforming coefficients define at least phases inducible by the plurality of tunable load impedance circuits for implementing the plurality of different reflection beams;
   measuring an incidence direction from which electromagnetic waves are received by the reconfigurable intelligent surface;
   calculating, based on the reference incidence direction, the measured incidence direction and the reference configuration information, corrected configuration information, which defines a plurality of corrected configurations of the plurality of tunable load impedance circuits for implementing the plurality of different reflection beams when reception occurs from the measured incidence direction, by calculating a correction matrix based on the reference incidence direction and the measured incidence direction, wherein the correction matrix defines a plurality of correction coefficients for the plurality of sets of beamforming coefficients, and by calculating the plurality of corrected configurations of the plurality of tunable load impedance circuits based on the plurality of beam codebooks and the correction matrix; and
   configuring the plurality of tunable load impedance circuits according to a corrected configuration defined in the corrected configuration information.

2. The apparatus according to claim 1, wherein the plurality of tunable load impedance circuits are tunable load impedance circuits of the subpanel of the reconfigurable intelligent surface and the at least one memory and the instructions are configured to, with the at least one processor, cause the apparatus to repeat at least the maintaining, the configuring, the detecting, the measuring, the calculating and the configuring for one or more further subpanels of the reconfigurable intelligent surface being associated with a different or same reference incidence direction as the subpanel.

3. The apparatus of claim 1, wherein the at least one memory and the instructions are configured to, with the at least one processor, cause the apparatus to perform:
   storing the measured incidence direction and the corrected configuration information to the at least one memory, wherein the measured incidence direction and the corrected configuration information are defined, in said at least one memory, as a new reference incidence direction and new reference configuration information.

4. The apparatus according to claim 1, wherein the at least one memory and the instructions are configured to, with the at least one processor, cause the apparatus to perform, before the measuring:
   configuring the plurality of tunable load impedance circuits according to a configuration defined in the configuration information.

5. The apparatus according to claim 4, wherein the at least one memory and the instructions are configured to, with the at least one processor, cause the apparatus to perform:
   determining, before the calculating of the corrected configuration information, whether or not the measured incidence direction differs from the reference incidence direction at least to an extent defined by one or more pre-defined criteria; and
   performing the calculating of the corrected configuration information and the configuring of the plurality of tunable load impedance circuits according to the corrected configuration in response to the measured incidence direction differing from the reference incidence direction at least to the extent defined by the one or more pre-defined criteria.

6. The apparatus according to claim 1, wherein the at least one memory and the instructions are configured to, with the at least one processor, cause the apparatus to perform:
   tuning the plurality of tunable load impedance circuits at least by adjusting phase shifts induced by a plurality of tunable phase shifting elements comprised in the plurality of tunable load impedance circuits.

7. The apparatus according to claim 1, wherein the calculating of the plurality of corrected configurations of the plurality of tunable load impedance circuits based on the plurality of beam codebooks and the correction load impedance matrix comprises:
   calculating a plurality of corrected beam codebooks by performing element-wise multiplication between the plurality of beam codebooks defined as matrices and the correction matrix; and
   calculating the plurality of corrected configurations of the plurality of tunable load impedance circuits based on the plurality of corrected beam codebooks.

8. The apparatus according to claim 1, wherein at least some of the plurality of tunable impedance load circuits are active circuits and correspondingly at least some of the plurality of sets of beamforming coefficients define both phases and gains inducible by said at least some of the plurality of tunable impedance load circuits.

9. The apparatus according to claim 1, wherein the at least one memory and the instructions are configured to, with the at least one processor, cause the apparatus to perform, before the maintaining:
  receiving information on the reference incidence direction and the reference configuration information via a radio receiver or transceiver from an access node over a control channel; and
  storing the reference incidence direction and the reference configuration information to the at least one memory.

10. The apparatus according to claim 1, wherein the at least one memory and the instructions are configured to, with the at least one processor, cause the apparatus to perform:
  maintaining, in the at least one memory, beam scheduling configuration information defining periodical or regular scheduling of different reflection beams for which configurations of the plurality of tunable load impedance circuits is defined in the configuration information; and
  configuring the plurality of tunable load impedance circuits according to the beam scheduling configuration information.

11. The apparatus according to claim 1, wherein the at least one memory and the instructions are configured to, with the at least one processor, cause the apparatus to perform:
  receiving, via a radio receiver or transceiver from an access node over a control channel, reflection beam selection configuration information for configuring the plurality of tunable load impedance circuits according to a particular configuration defined in the configuration information and corresponding to a particular reflection beam; and
  configuring the plurality of tunable load impedance circuits according to the reflection beam selection configuration information so as to implement said particular reflection beam.

12. The apparatus according to claim 1, wherein the at least one memory and the instructions are configured to, with the at least one processor, cause the apparatus to perform:
  maintaining, in the least one memory, information on a plurality of reference incidence directions and a plurality of reference incidence direction-specific sets of reference configuration information defining a plurality of configurations of the plurality of tunable load impedance circuits for implementing a plurality of different reflection beams when reception occurs from the plurality of reference incidence directions, wherein the plurality of reference incidence directions comprise the reference incidence direction;
  receiving, via a radio receiver or transceiver from an access node over a control channel, reference incidence direction selection configuration information for configuring the plurality of tunable load impedance circuits to use a particular reference incidence direction specific set of reference configuration information; and
  configuring the plurality of tunable load impedance circuits according to the reference incidence direction selection configuration information.

13. A reconfigurable intelligent surface comprising:
  a tunable reflective array comprising a plurality of reflective elements and a plurality of tunable load impedance circuits electrically connected to the plurality of reflective elements for affecting phases of electromagnetic waves reflected by the plurality of reflective elements; and
  an apparatus comprising:
  at least one processor, and
  at least one memory for storing instructions to be executed by the processor, wherein the at least one memory and the instructions are configured to, with the at least one processor, cause the apparatus at least to perform:
  maintaining, in said at least one memory, information on a reference incidence direction and reference configuration information defining a plurality of configurations of a plurality of tunable load impedance circuits of a tunable reflective array of a reconfigurable intelligent surface or a subpanel thereof for implementing a plurality of different reflection beams when reception occurs from the reference incidence direction;
  maintaining, in said at least one memory, a plurality of beam codebooks defining a plurality of sets of beamforming coefficients for the tunable reflective array, wherein the plurality of sets of beamforming coefficients define at least phases inducible by the plurality of tunable load impedance circuits for implementing the plurality of different reflection beams;
  measuring an incidence direction from which electromagnetic waves are received by the reconfigurable intelligent surface;
  calculating, based on the reference incidence direction, the measured incidence direction and the reference configuration information, corrected configuration information, which defines a plurality of corrected configurations of the plurality of tunable load impedance circuits for implementing the plurality of different reflection beams when reception occurs from the measured incidence direction, by calculating a correction matrix based on the reference incidence direction and the measured incidence direction, wherein the correction matrix defines a plurality of correction coefficients for the plurality of sets of beamforming coefficients, and by calculating the plurality of corrected configurations of the plurality of tunable load impedance circuits based on the plurality of beam codebooks and the correction matrix; and
  configuring the plurality of tunable load impedance circuits according to a corrected configuration defined in the corrected configuration information.

14. The reconfigurable intelligent surface according to claim 13, further comprising:
  a radio receiver or transceiver for reception of one or more control signals from one or more access nodes via a control channel.

15. A system comprising:
  a reconfigurable intelligent surface and an access node,
  the reconfigurable intelligent surface comprising a tunable reflective array, a radio receiver or transceiver for reception of one or more control signals from one or more access nodes via a control channel, and an apparatus, wherein the tunable reflective array comprise a plurality of reflective elements and a plurality of tunable load impedance circuits electrically connected to the plurality of reflective elements for affecting phases of electromagnetic waves reflected by the plurality of reflective elements; and wherein the apparatus comprises at least one processor, and at least one memory for storing instructions to be executed by the processor, wherein the at least one memory and the instructions are configured to, with the at least one processor, cause the apparatus at least to perform:

maintaining, in said at least one memory, information on a reference incidence direction and reference configuration information defining a plurality of configurations of a plurality of tunable load impedance circuits of a tunable reflective array of a reconfigurable intelligent surface or a subpanel thereof for implementing a plurality of different reflection beams when reception occurs from the reference incidence direction;

maintaining, in said at least one memory, a plurality of beam codebooks defining a plurality of sets of beamforming coefficients for the tunable reflective array, wherein the plurality of sets of beamforming coefficients define at least phases inducible by the plurality of tunable load impedance circuits for implementing the plurality of different reflection beams;

measuring an incidence direction from which electromagnetic waves are received by the reconfigurable intelligent surface;

calculating, based on the reference incidence direction, the measured incidence direction and the reference configuration information, corrected configuration information, which defines a plurality of corrected configurations of the plurality of tunable load impedance circuits for implementing the plurality of different reflection beams when reception occurs from the measured incidence direction, by calculating a correction matrix based on the reference incidence direction and the measured incidence direction, wherein the correction matrix defines a plurality of correction coefficients for the plurality of sets of beamforming coefficients, and by calculating the plurality of corrected configurations of the plurality of tunable load impedance circuits based on the plurality of beam codebooks and the correction matrix; and configuring the plurality of tunable load impedance circuits according to a corrected configuration defined in the corrected configuration information;

the access node comprising at least one processor, and at least one memory for storing instructions to be executed by the processor, wherein the at least one memory and the instructions are configured to, with the at least one processor, cause the access node at least to transmit one or more control signals to the reconfigurable intelligent surface via a control channel.

16. A method comprising:

maintaining, in at least one memory, information on a reference incidence direction and reference configuration information defining a plurality of configurations of a plurality of tunable load impedance circuits of a tunable reflective array of a reconfigurable intelligent surface or a subpanel thereof for implementing a plurality of different reflection beams when reception occurs from the reference incidence direction;

maintaining, in said at least one memory, a plurality of beam codebooks defining a plurality of sets of beamforming coefficients for the tunable reflective array, wherein the plurality of sets of beamforming coefficients define at least phases inducible by the plurality of tunable load impedance circuits for implementing the plurality of different reflection beams;

measuring an incidence direction from which electromagnetic waves are received by the reconfigurable intelligent surface;

calculating, based on the reference incidence direction, the measured incidence direction and the reference configuration information, corrected configuration information, which defines a plurality of corrected configurations of the plurality of tunable load impedance circuits for implementing the plurality of different reflection beams when reception occurs from the measured incidence direction, by calculating a correction matrix based on the reference incidence direction and the measured incidence direction, wherein the correction matrix defines a plurality of correction coefficients for the plurality of sets of beamforming coefficients, and by calculating the plurality of corrected configurations of the plurality of tunable load impedance circuits based on the plurality of beam codebooks and the correction matrix; and configuring the plurality of tunable load impedance circuits according to a corrected configuration defined in the corrected configuration information.

17. A computer program product, embodied on a non-transitory computer readable medium, comprising program instructions, that when run is adapted to perform:

maintaining, in at least one memory, information on a reference incidence direction and reference configuration information defining a plurality of configurations of a plurality of tunable load impedance circuits of a tunable reflective array of a reconfigurable intelligent surface or a subpanel thereof for implementing a plurality of different reflection beams when reception occurs from the reference incidence direction;

maintaining, in said at least one memory, a plurality of beam codebooks defining a plurality of sets of beamforming coefficients for the tunable reflective array, wherein the plurality of sets of beamforming coefficients define at least phases inducible by the plurality of tunable load impedance circuits for implementing the plurality of different reflection beams;

measuring an incidence direction from which electromagnetic waves are received by the reconfigurable intelligent surface;

calculating, based on the reference incidence direction, the measured incidence direction and the reference configuration information, corrected configuration information, which defines a plurality of corrected configurations of the plurality of tunable load impedance circuits for implementing the plurality of different reflection beams when reception occurs from the measured incidence direction, by calculating a correction matrix based on the reference incidence direction and the measured incidence direction, wherein the correction matrix defines a plurality of correction coefficients for the plurality of sets of beamforming coefficients, and by calculating the plurality of corrected configurations of the plurality of tunable load impedance circuits based on the plurality of beam codebooks and the correction matrix; and configuring the plurality of tunable load impedance circuits according to a corrected configuration defined in the corrected configuration information.

* * * * *